US012559407B2

(12) United States Patent
Barnard et al.

(10) Patent No.: US 12,559,407 B2
(45) Date of Patent: Feb. 24, 2026

(54) METHODS TO CONTROL THERMAL VARIATION DURING TUBE CONSUMPTION IN GLASS TUBE CONVERTING

(71) Applicant: CORNING INCORPORATED, Corning, NY (US)

(72) Inventors: Christelle Ruby Barnard, Painted Post, NY (US); Joseph Michael Matusick, Corning, NY (US); Kevin Patrick McNelis, Elmira, NY (US); Connor Thomas O'Malley, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 91 days.

(21) Appl. No.: 18/658,939

(22) Filed: May 8, 2024

(65) Prior Publication Data

US 2024/0294416 A1 Sep. 5, 2024

Related U.S. Application Data

(62) Division of application No. 17/400,167, filed on Aug. 12, 2021, now Pat. No. 12,006,244.

(Continued)

(51) Int. Cl.
| | |
|---|---|
| *C03B 23/043* | (2006.01) |
| *C03B 23/045* | (2006.01) |
| *C03B 23/09* | (2006.01) |

(52) U.S. Cl.
CPC .......... *C03B 23/043* (2013.01); *C03B 23/045* (2013.01); *C03B 23/09* (2013.01)

(58) Field of Classification Search
None
See application file for complete search history.

(56) References Cited

U.S. PATENT DOCUMENTS

| | | | |
|---|---|---|---|
| 4,818,266 A | 4/1989 | Sachs et al. | |
| 2012/0047955 A1 | 3/2012 | Belgum et al. | |

(Continued)

FOREIGN PATENT DOCUMENTS

| | | |
|---|---|---|
| CN | 1319570 A | 10/2001 |
| CN | 108275870 A | 7/2018 |

(Continued)

OTHER PUBLICATIONS

Chinese Patent Application No. 202180070155.0 , Office Action dated Apr. 11, 2025, 5 pages (English Translation only), Chinese Patent Office.

(Continued)

*Primary Examiner* — Queenie S Dehghan
(74) *Attorney, Agent, or Firm* — Michael G. Panian

(57) ABSTRACT

Methods for producing articles from a glass tube include securing a working end of the glass tube in a glass tube holder of a converter having a plurality of processing stations including a heating station and a forming station. An initial length of the glass tube includes a plurality of serial segments, each of the plurality of serial segments corresponding to one article and having an article number. The methods include heating the working end of the glass tube in the heating station, adjusting an amount of heating of the glass tube in the heating station based on the article number at the working end of the glass tube, and forming a feature of the article in the forming station. Adjusting the amount of heating based on the article number reduces variation in tube temperature, article dimensions, or both, from one article number to the next article number.

10 Claims, 13 Drawing Sheets

Related U.S. Application Data

(60) Provisional application No. 63/066,475, filed on Aug. 17, 2020.

(56) References Cited

U.S. PATENT DOCUMENTS

| | | | |
|---|---|---|---|
| 2018/0162765 | A1 | 6/2018 | Witzmann et al. |
| 2018/0273418 | A1 | 9/2018 | Gaylo et al. |
| 2019/0161384 | A1 | 5/2019 | McEnroe |
| 2019/0389118 | A1 | 12/2019 | McKillip |
| 2020/0223737 | A1 | 7/2020 | Ma et al. |
| 2023/0257292 | A1 | 8/2023 | Gaylo et al. |

FOREIGN PATENT DOCUMENTS

| | | | |
|---|---|---|---|
| CN | 108495825 | A | 9/2018 |
| CN | 110944951 | A | 3/2020 |
| DE | 1771978 | A1 | 1/1972 |
| JP | 51-001731 | A | 1/1976 |
| JP | 2018-095547 | A | 6/2018 |
| JP | 2020-514766 | A | 5/2020 |

OTHER PUBLICATIONS

International Search Report and Written Opinion of the International Searching Authority; PCT/US2021/044581; dated Nov. 4, 2021; 9 pages; European Patent Office.

Japanese Patent Application No. 2023-511965, Office Action dated Jul. 30, 2025, 2 pages (English Translation only), Japanese Patent Office.

DIMENSION 0  2  4  6  8  10    14    18    22    26  0

TIME (msec)

METHODS TO CONTROL THERMAL VARIATION DURING TUBE CONSUMPTION IN GLASS TUBE CONVERTING

CROSS-REFERENCE TO RELATED APPLICATIONS

This application is a divisional of U.S. patent application Ser. No. 17/400,167 filed on Aug. 12. 2021, which claims the benefit of priority under 35 U.S.C. § 119 of U.S. Provisional Application Ser. No. 63/066,475 filed on Aug. 17, 2020, the content of which is relied upon and incorporated herein by reference in its entirety.

BACKGROUND

Field

The present specification generally relates to systems and methods for producing glass articles from glass tubes, in particular, systems and methods for reducing temperature and dimensional variation during glass tube converting process.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability to prevent effecting the stability of the pharmaceutical formulations contained therein. Glasses having suitable chemical durability include those glass compositions within the ASTM standard 'Type IA' and 'Type IB' glass compositions, which have a proven history of chemical durability.

Glass tubing may be converted into other glass articles, such as various glass containers for use in pharmaceutical applications including, without limitation, vials, syringes, ampoules, cartridges and other glass articles. The glass tubing may be converted, for example, in "converting machines." Converting machines have been used for over 75 years, and are currently made by various commercial and internal equipment suppliers. These converting machines typically reform long glass tube lengths into a plurality of glass articles using steps, which include flame working, rotating and stationary tool forming, thermal separation, or score and shock cutoff steps. A series of burners is often used to separate a portion or segment from a glass tube and shape it to specific dimensions.

SUMMARY

During the converting process, the temperature of the length of glass tube loaded into the converting machine can change as the glass tube is consumed over multiple passes through the converting process. These temperature variations of the length of glass tube can cause dimensional and cosmetic variations in the glass articles made from the glass tube. Accordingly, a need exists for systems and methods for converting glass tubes into glass articles, such as pharmaceutical packaging, while reducing temperature variations of the glass tube during incremental consumption of the glass tube in the converting process.

In a first aspect of the present disclosure, a method for producing a plurality of articles from a glass tube may include securing a working end of the glass tube in a glass tube holder of a converter having a plurality of processing stations comprising at least one heating station and at least one forming station after the at least one heating station. The converter may move the glass tube holder through the plurality of processing stations. An initial length of the glass tube may comprise a plurality of serial segments, each of the plurality of serial segments corresponding to one article and having an article number. The method may further include heating the working end of the glass tube at the at least one heating station and increasing or decreasing an amount of heating of the glass tube based on the article number corresponding to the working end of the glass tube. Increasing or decreasing the amount of heating based on the article number may reduce variation in tube temperature, article dimensions, or both, from one article number to the next article number. The method may further include forming at least one feature of the article at the working end of the glass tube in the at least one forming station, separating the article from the working end of the glass tube at a separating station, and indexing the glass tube downward in the glass tube holder to form a subsequent article.

A second aspect of the present disclosure may include the first aspect, wherein increasing or decreasing the amount of heating of the glass tube may comprise at least one of: increasing or decreasing a burner dwell time of the working end of the glass tube in contact with a heating element in the at least one heating station based on the article number at the working end of the glass tube; increasing or decreasing a heating rate of the heating element in the at least one heating station based on the article number of the working end of the glass tube; or adjusting a negative pressure produced by an exhaust system proximate the glass tube in the at least one heating station based on the article number of the working end of the glass tube.

A third aspect of the present disclosure may include any one of the first or second aspects, wherein the plurality of processing stations may comprise a plurality of heating stations and the method may comprise increasing or decreasing an amount of heating of the glass tube in each of the plurality of heating stations based on the article number corresponding to the working end of the glass tube.

A fourth aspect of the present disclosure may include any one of the first through third aspects, wherein the variations in tube temperature, article dimensions, or both, at the working end of the glass tube may be functions of the article number of the article being formed at the working end of the glass tube.

A fifth aspect of the present disclosure may include any one of the first through fourth aspects, wherein increasing or decreasing the amount of heating of the working end of the glass tube may comprise increasing or decreasing a burner dwell time of the glass tube in contact with a heating element in the at least one heating station based on the article number at the working end of the glass tube.

A sixth aspect of the present disclosure may include any the fifth aspect, wherein the heating element in the at least one heating station may comprise a swivel burner that may pivot into and out of engagement with the working end of the glass tube.

A seventh aspect of the present disclosure may include the sixth aspect, wherein increasing or decreasing the burner dwell time may comprise adjusting a timing of pivoting the swivel burner into or out of engagement with the working end of the glass tube.

An eighth aspect of the present disclosure may include any one of the first through seventh aspects, wherein increasing or decreasing the amount of heating of the working end of the glass tube may comprise increasing or decreasing a heating rate of the heating element in the at least one heating station based on the article number of the working end of the glass tube.

A ninth aspect of the present disclosure may include the eighth aspect, wherein the heating element may comprise a burner and increasing or decreasing the heating rate may comprise increasing or decreasing a flow rate of one or more combustion gases supplied to the burner. The combustion gases may include fuel gas and oxygen, air, or both.

A tenth aspect of the present disclosure may include the ninth aspect, wherein increasing or decreasing the heating rate may comprise increasing or decreasing a flow rate of all the combustion gases to the burner in proportion.

An eleventh aspect of the present disclosure may include the ninth aspect, wherein increasing or decreasing the heating rate may comprise modifying a flow ratio of fuel gas to oxygen supplied to the burner.

A twelfth aspect of the present disclosure may include any one of the first through eleventh aspects, wherein increasing or decreasing the amount of heating of the working end of the glass tube may comprise adjusting a negative pressure produced by an exhaust system proximate the at least one heating station based on the article number of the working end of the glass tube.

A thirteenth aspect of the present disclosure may include any the twelfth aspect, wherein adjusting the negative pressure produced by the exhaust system proximate to the at least one heating station may comprise decreasing or increasing a speed of an air handler fluidly coupled to an inlet vent positioned proximate to the at least one heating station, adjusting a position of a damper disposed between the air handler and the inlet vent, or both.

A fourteenth aspect of the present disclosure may include the twelfth aspect, wherein adjusting the negative pressure produced by the exhaust system proximate to the at least one heating station may comprise adjusting a position of an inlet vent of the exhaust system relative to the glass tube in the at least one heating station.

A fifteenth aspect of the present disclosure may include any one of the first through fourteenth aspects, wherein the converter may comprise a plurality of glass tube holders and the method may comprise moving each of the plurality of glass tube holders through each of the plurality of processing stations and increasing or decreasing the amount of heating at the working end of the glass tube based on the article number each time the plurality of glass tube holders are moved to the next processing station.

A sixteenth aspect of the present disclosure may include any one of the first through fourteenth aspects, further comprising, after a last article corresponding to a last article number of a glass tube is produced, securing a new length of the glass tube in the tube holder.

A seventeenth aspect of the present disclosure may include the sixteenth aspect, wherein the converter may comprise a plurality of glass tube holders and the method may further comprise securing a new length of the glass tube in each of the plurality of glass tube holders in consecutive order starting with a first glass tube.

An eighteenth aspect of the present disclosure may include the seventeenth aspect, comprising, in response to a change in an article number at a working end of the first glass tube at the at least one heating station, changing an amount of heating of the working end of the first glass tube based on the article number and maintaining the amount of heating at the at least one heating station from glass tube to glass tube until the first glass tube returns to the at least one heating station and the article number at the working end of the first glass tube changes.

In a nineteenth aspect of the present disclosure, a method for producing a plurality of articles from a glass tube may include introducing the glass tube to a glass tube holder of a converter having a plurality of processing stations comprising at least one heating station and at least one forming station after the at least one heating station. The converter may move the glass tube holder through the plurality of processing stations. The method may further include heating a working end of the glass tube at the at least one heating station and forming at least one feature of a first article at the working end of the glass tube in the at least one forming station, the first article corresponding to a first serial position along a length of the glass tube. The method may further include separating the first article from the working end of the glass tube at a separating station and, after separation, indexing the glass tube downward in the glass tube holder to form a second article from the glass tube, the second article corresponding to a second serial position along the length of the glass tube. The method may further include heating the working end of the glass tube corresponding to the second serial position at the at least one heating station and increasing or decreasing an amount of heating of the glass tube corresponding to the second serial position relative to the heating of the first article. Increasing or decreasing the amount of heating of the working end of the glass tube for the second article relative to the first article may reduce temperature or dimensional variability in the second article relative to the first article.

In a twentieth aspect of the present disclosure, a system for producing a plurality of articles from a glass tube may include a converter including a plurality of processing stations comprising at least one heating station, at least one forming station, and a separating station. The converter may be operable to move the glass tube through the plurality of processing stations. The system may further include a system controller communicatively coupled to the converter. The system controller may comprise a processor and a storage medium containing computer readable and executable instructions which, when executed by the processor, may cause the system controller to automatically determine an article number at a working end of the glass tube, wherein the article number comprises an integer corresponding to a serial segment of an initial length of the glass tube, each serial segment corresponding to one article, and increase or decrease an amount of heating of the glass tube in the at least one heating station based on the article number at the working end of the glass tube.

A twenty-first aspect of the present disclosure may include the twentieth aspect, wherein the at least one heating station may comprise a swivel burner operable to pivot into and out of engagement with the working end of the glass tube and the system controller may be communicatively coupled to the swivel burner.

A twenty-second aspect of the present disclosure may include either one of the twentieth or twenty-first aspects, wherein the computer readable and executable instructions which, when executed by the processor, may cause the system controller to automatically increase or decrease a burner dwell time of the working end of the glass tube based on the article number at the working end of the glass tube by pivoting the swivel burner into or out of engagement with the working end of the glass tube.

A twenty-third aspect of the present disclosure may include any one of the twentieth through twenty-second aspects, wherein the at least one heating station may comprises at least one burner and at least one flow controller that may be operable to increase or decrease a mass flow rate of one or more combustion gases to the at least one burner.

A twenty-fourth aspect of the present disclosure may include the twenty-third aspect, wherein the computer readable and executable instructions, when executed by the processor, may cause the system controller to automatically increase or decrease a mass flow rate of one or more combustion gases to the at least one burner based on the article number at the working end of the glass tube.

A twenty-fifth aspect of the present disclosure may include any one of the twentieth through twenty-fourth aspects, wherein the converter may comprises an exhaust system comprising at least one inlet vent and an air handler fluidly coupled to the at least one inlet vent.

A twenty-sixth aspect of the present disclosure may include the twenty-fifth aspect, wherein the computer readable and executable instructions, when executed by the processor, may cause the system controller to automatically adjust a negative pressure produced by the exhaust system proximate to the glass tube based on the article number of the working end of the glass tube.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
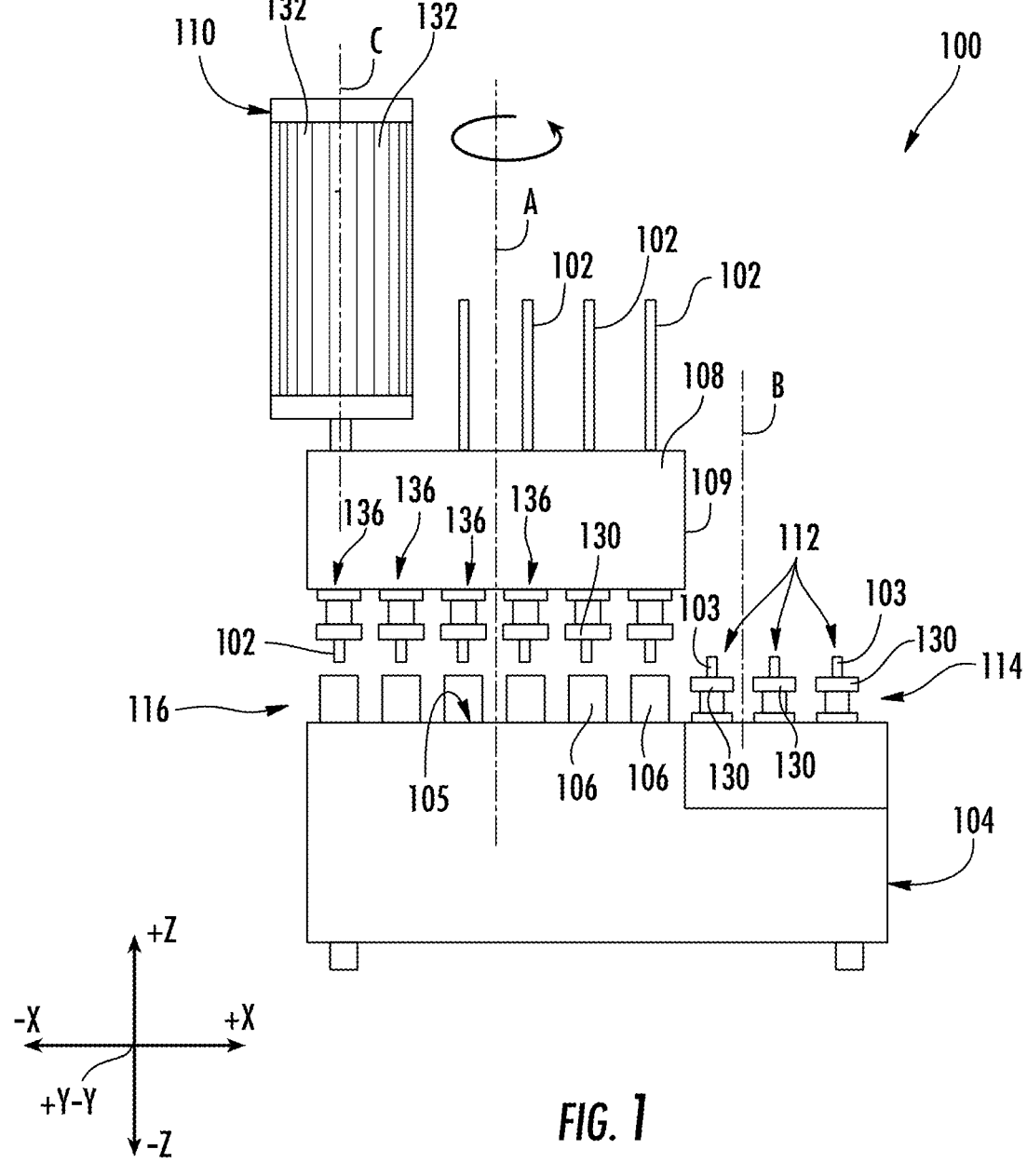
FIG. 1 schematically depicts an embodiment of a converter for producing glass articles from glass tubes, according to one or more embodiments shown and described herein.

Reference will now be made in detail to embodiments of systems and methods for reducing the temperature and dimensional variations in glass articles produced from converting processes for converting glass tube into glass articles, examples of which are illustrated in the accompanying drawings. Whenever possible, the same reference numerals will be used throughout the drawings to refer to the same or like parts. Glass tubing may be converted into glass articles, in particular glass articles for use in pharmaceutical applications, which may include, without limitation, vials, syringes, ampoules, cartridges and other glass articles. The glass tubing may be converted into these glass articles using a converter, such as a converting machine, comprising a plurality of processing stations. The processing stations may include heating stations, forming stations, thermal separating stations, and piercing stations, among other types of processing stations. The converting machines typically reform long glass tube lengths into a plurality of glass articles using steps that include, but are not limited to, flame working, rotating and stationary tool forming, thermal separation, or score and shock cutoff steps. Thus, glass articles produced through a converting process conducted on a converting machine are subjected to a series of flame burners or other heating elements to separate a portion from a glass tube and shape it to specific dimensions.

During the converting process, the glass tubes are loaded into the converting machine at room temperature (approximately 23° C.), but the non-working portion of the glass tube can increase in temperature to over 200° C. during consumption of the glass tube due to the heat given off by the flame burners on the converter or converting machine. When the glass tubes approach full consumption, the shortened length of the glass tubes can result in greater gas flow rates through the tubes, which can also effect the temperatures of the glass tubes. The changes in the temperatures of the glass tubes during processing and consumption of the glass tube may cause dimensional and cosmetic variations in the glass articles formed during the converting process. The variation in glass tube temperature and the resulting dimensional and cosmetic variations can constrain the operating window of the converting process, decrease the process capability (Cpk), and can decrease yields. The decreases in yield may result from lesser production rates or yield loss due to the dimensional and cosmetic variations that cause the articles to be out-of-specification. For certain SKU numbers run under certain process conditions, the yield loss from dimensional and cosmetic variations can be greater than 30%, and at least a portion of this yield loss can be attributed to temperature variations in the glass tubes during converting.

Various solutions to reduce temperature variation in the glass tube stock as it is consumed have been proposed, but have not been found to be sufficient for reducing the dimensional and cosmetic variability caused by temperature variation of the glass tube as it is consumed. For example, some operators have preheated the glass tubes on the tube carousel or above the machine prior to loading the glass tubes into the converting machine. This method is not feasible in the current converting process because the tube loader is comprised of plastic to avoid metal-on-glass contact, and preheating the glass tubes to sufficient temperatures to reduce the thermal variation deforms the plastic of the tube loader. In another proposed solution, the glass tubes have been closed or closed and vented to prevent heated gases from flowing up through the center cavity of the glass tube. However, closed or closed and vented glass tubes require specialized forming equipment on the converting machine and, even when implemented, do not eliminate the thermal variability in the process.

Thus, there is a continued need for systems and methods for converting glass tubes into glass articles, such as pharmaceutical packaging, while reducing temperature variations in the glass tube during incremental consumption of the glass tube through the converting process. The systems and methods of the present disclosure are directed to adjusting an amount of heating of the glass tube based on the article number at the working end of the glass tube to compensate for the changing temperature of the length of glass tube as the glass tube is consumed. The amount of heating of the glass tube can be conducted on a per-article basis and/or on a per-revolution of the main turret basis as the glass tube is consumed.

An initial length of the glass tube can be conceptually divided into plurality of serial segments, each of which corresponding to one article and associated with an article number. With the first article made from the glass tube assigned to article number 1, the temperature of each successive serial segment changes as the article number increases. Using a relational database in which the article number at the working end of the glass tube is tracked, a controller can be used to control burner dwell time, burner output/heating rate, or exhaust flow on a per-article basis to regulate the tube temperature towards a more "steady state" condition.

Figure 5:
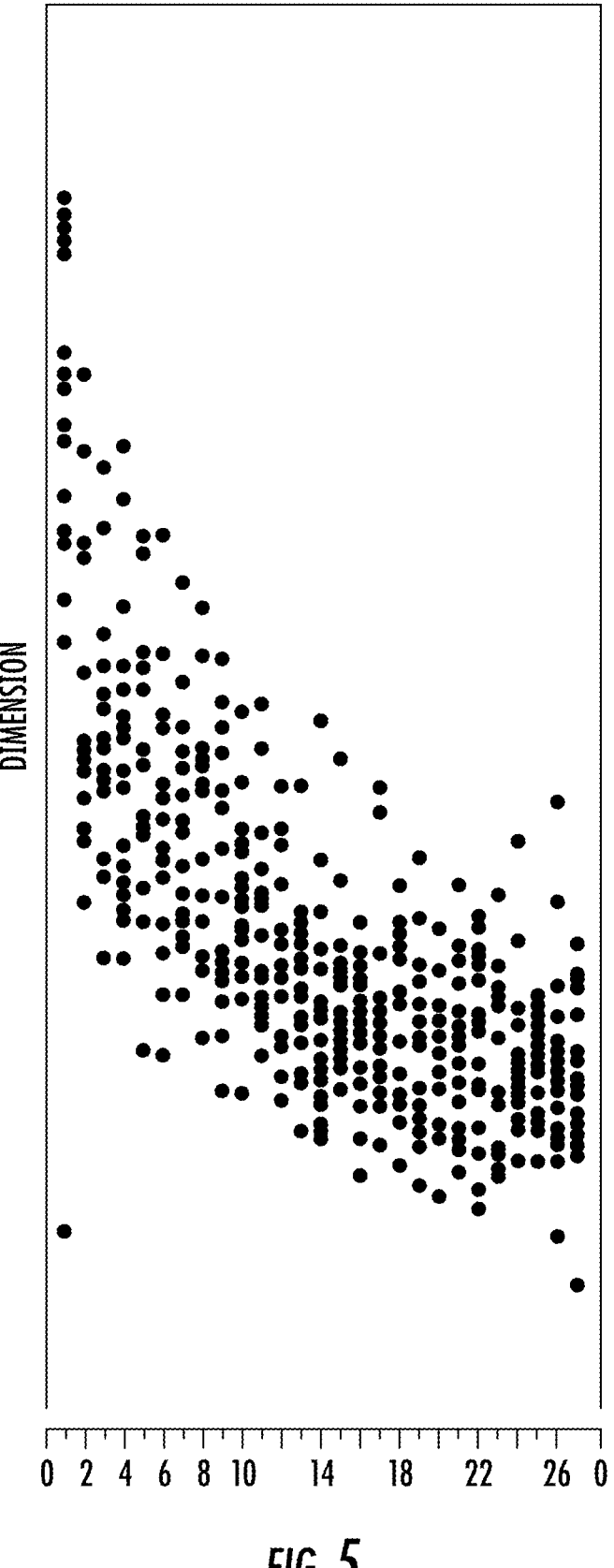
FIG. 5 graphically depicts a dimension of a feature of a glass vial (y-axis) as a function of article number (x-axis) produced without compensation for thermal variability of the glass tube.

An embodiment of a system for producing articles from glass tube is depicted in FIG. 1. In the embodiment depicted in FIG. 1, the system for producing glass articles from a glass tube 102 includes a converter 100 having a plurality of processing stations 106 that include at least one heating station, at least one forming station, and a separating station. The converter 100 is operable to move a glass tube 102 through the plurality of processing stations 106. Referring to FIG. 5, the system may include a system controller 400 (FIG. 5) communicatively coupled to the converter 100. The system controller 400 may be operable to determine the article number at the working end 150 of the glass tube 102, and increase or decrease an amount of heating of the glass tube 102 in the at least one heating station 202 based on the article number at the working end 150 of the glass tube 102.

A method for producing a plurality of articles from a glass tube 102 may include securing the working end 150 of the glass tube 102 in a glass tube holder 130 of the converter 100 having the plurality of processing stations 106. The processing stations 106 may include at least one heating station and at least one forming station after the at least one heating station. The converter 100 moves the glass tube holder 130 and glass tube 102 secured therein through the plurality of processing stations 106. The initial length of the glass tube comprises a plurality of serial segments, each of the plurality of serial segments corresponding to one article and having an article number. The method may include heating the working end 150 of the glass tube 102 at the at least one heating station 202, increasing or decreasing an amount of heating of the glass tube 102 based on the article number corresponding to the working end 150 of the glass tube 102, forming at least one feature of the article at the working end 150 of the glass tube 102 in the at least one forming station, separating the article from the working end 150 of the glass tube 102 at a separating station, and indexing the glass tube 102 downward in the glass tube holder 130 to form a subsequent article.

Increasing or decreasing the amount of heating based on the article number may reduce variation in tube temperature, article dimensions, or both, from one article number to the next article number. Controlling an amount of heating of the glass tube based on the article number at the working end of the glass tube may allow for greater granularity in the control scheme and may reduce process variability by vial number. This may in turn widen the process window for the converting process and reduce out-of-specification articles. Thus, the yields from the converting process may be increased by reducing yield loss and increasing production rate, among other features. It should be understood that various aspects of the systems and methods disclosed herein are described in the context of a converting process for producing pharmaceutical vials; however, it is understood that the systems and methods can be applied to converting processes for producing other articles, such as but not limited to cartridges, syringes, ampoules, etc.

Directional terms as used herein—for example up, down, right, left, front, back, top, bottom—are made only with reference to the figures as drawn and the coordinate axis provided therewith and are not intended to imply absolute orientation.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, the "working end" of the glass tube is the end of the glass tube oriented towards the processing stations of the converter relative to the holder, and the "non-working end" of the glass tube is the end of the glass tube oriented away from the processing station.

As used herein, a "dwell time" of the converter refers to the duration of time that the glass tube spends in a particular processing station before being moved to the next subsequent processing station.

As used herein, a "burner dwell time" refers to a duration of time that a flame of a burner is engaged with the glass tube to heat the glass tube.

Referring now to FIG. 1, the converter 100 for producing glass articles from a glass tube 102 is schematically depicted. The converter 100 may be used to convert glass tubes 102 into a plurality of glass articles, such as, but not limited to, vials, syringes, cartridges, ampoules, or other glass articles. The converter 100 includes a base 104 having a plurality of processing stations 106 and a main turret 108 positioned above the base 104 and rotatable relative to the base 104 about the central axis A. The converter 100 may further include a glass tube loading turret 110 positioned above the main turret 108 for feeding glass tubes 102 to the main turret 108. The converter 100 may also include a plurality of secondary processing stations 112 on the base 104 and a secondary turret 114, which is rotatable relative to the base 104.

As schematically depicted in FIG. 1, the base 104 of the converter 100 is stationary and the processing stations 106 may be coupled to an upper portion 105 of the base 104. The plurality of processing stations 106 are spaced apart from one another and arranged in a main circuit 116. In one or more embodiments, the main circuit 116 may be circular so that the main turret 108 may move a glass tube 102 through the plurality of processing stations 106 by rotation of the main turret 108 about the central axis A. Alternatively, in other embodiments, the main circuit 116 may be linear. Although described herein in reference to a circular-shaped layout of processing stations 106, it is understood that the subject matter disclosed herein may apply equally well to converters having other arrangements of the processing stations 106.

The type and/or shape of the article to be made from the glass tube 102 may influence the number of processing stations 106 coupled to the base 104. The number of processing stations 106 of the main turret 108 may be from 14 to 32 processing stations 106. Although the converter 100 and converting process are described herein in the context of a converter 100 having sixteen processing stations 106 in the main circuit 116, it is understood that the converter 100 may have more or less than sixteen processing stations 106 in the main circuit 116. The processing stations 106 may include, by way of example and without limitation, one or more heating, forming, polishing, cooling, separating, piercing, measuring, feeding, or discharge stations or other processing stations for producing the glass articles from the glass tubes 102. The type and/or shape of the article to be made from the glass tube 102 may also influence the type of processing stations 106 and/or order of processing stations 106 of the converter 100.

The main turret 108 may be positioned above the base 104 and may be rotatably coupled to the base 104 so that the main turret 108 is rotatable about the central axis A relative to the base 104. A drive motor (not shown) may be utilized to rotate the main turret 108 relative to the base 104. The main turret 108 may include a plurality of holders 130, which are configured to removably secure each glass tube 102 to the main turret 108. The holders 130 may be clamps, chucks, or other holding devices, or combinations of holding devices. The holders 130 may orient each glass tube 102 so that the glass tube 102 is generally parallel to the central axis A of the main turret 108 and generally perpendicular to the upper portion 105 of the base 104. Although the converter 100 is described in this specification in the context of a vertically oriented converter 100, it should be understood that the converter 100 may be oriented horizontally or at an angle. Each of the holders 130 extends from a bottom portion 109 of the main turret 108 in a direction towards the base 104 (i.e., in the −Z direction relative to the coordinate axis in FIG. 1), and each holder 130 is oriented to position the glass tube 102 in or proximate to each of the successive processing stations 106 of the main circuit 116 of the base 104 as the main turret 108 is indexed about the central axis A. Vertical orientation of the glass tubes 102 allows a downward protruding portion of each glass tube 102 to be cycled progressively through the processing stations 106 of the main circuit 116. In embodiments, the converter 100 may be operable to index each of the plurality of holders 130 progressively through the plurality of processing stations 106. Alternatively, in embodiments, the converter 100 may be operable to translate the plurality of holders 130 continuously through the converting process. Each holder 130 may be individually rotatable relative to the main turret 108 about holder axis D, which may be generally parallel to the central axis A of the main turret 108. Each of the holders 130 may be operatively coupled to a motor (not shown), continuous drive belt, or other drive mechanism for rotation of each of the holders 130 relative to the main turret 108. Rotation of the holders 130 allows for rotation of the glass tube 102 relative to stationary burners, forming tools, cooling nozzles, or other features of the processing stations 106.

Figure 2:
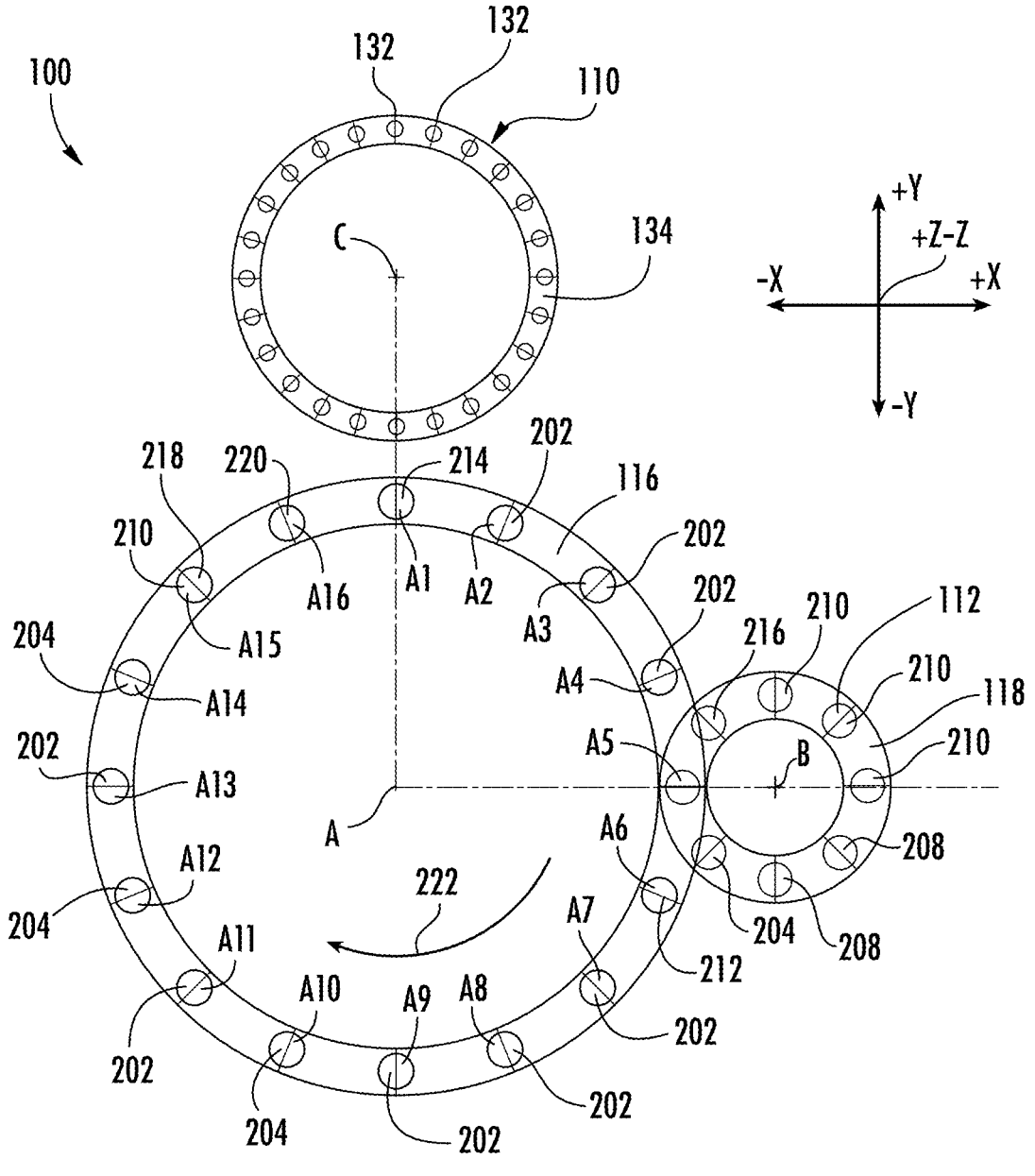
FIG. 2 schematically depicts a top view of a main turret, a secondary turret, and a feed turret of the converter of FIG. 1, according to one or more embodiments shown and described herein.

Referring to FIGS. 1 and 2, the converter 100 may have a plurality of secondary processing stations 112, which are also spaced apart and arranged in a secondary circuit 118 (FIG. 2), and a secondary turret 114 (FIG. 1) for indexing an article 103 (FIG. 1), which has been separated from the glass tube 102, through the plurality of secondary processing stations 112. The secondary turret 114 may be rotatable about a second axis B relative to the base 104. The second axis B may be generally parallel to central axis A of the main turret 108. The secondary turret 114 also includes a plurality of holders 130 to hold the glass articles 103 and position the glass articles 103 to engage with each of the secondary processing stations 112 in succession. The secondary turret 114 may receive the articles 103 from a separating station 206 (FIG. 2) of the main turret 108, index the articles 103 through the plurality of secondary processing stations 112 through rotation of the secondary turret 114, and discharge the finished articles from the converter 100.

The glass tube loading turret 110 may be positioned above the main turret 108. In embodiments, the glass tube loading turret 110 may be offset from the central axis A of the main turret 108. The glass tube loading turret 110 may be rotatable about an axis C, which may be generally parallel to the central axis A of the main turret 108. The glass tube loading turret 110 may be independently supported in a stationary position relative to the main turret 108, and rotation of the glass tube loading turret 110 may be independent of the rotation of the main turret 108. Referring to FIGS. 1 and 2, in some embodiments, the glass tube loading turret 110 may include a plurality of loading channels 132 arranged in a circular circuit 134 and configured to hold glass tubes 102. The glass tube loading turret 110 may be positioned to orient one of the loading channels 132 into vertical alignment (i.e., aligned in a direction parallel to the central axis A of the main turret 108 and/or parallel to the Z axis of FIG. 1) with a processing station 106 of the main circuit 116 of the converter 100 and the corresponding holders 130 on the main turret 108 that are indexed through the processing station 106 of the main circuit 116. In one or more embodiments, the processing station 106 aligned with the glass tube loading turret 110 may be a tube loading station 214 (FIG. 2). When the converter 100 has converted all or at least a portion of the glass tube 102 at a specific holder position 136 into one or more articles, the glass tube loading turret 110 may deliver a new length of glass tube 102 through the top of the main turret 108 to the holder 130 at the holder position 136, when the holder position 136 indexes into alignment with the tube loading station 214 (FIG. 2) of the main circuit 116. In alternative embodiments, the converter 100 may include an arm (not shown) movable between the main turret 108 and the glass tube loading turret 110. When the converter 100 has converted all or a portion of the glass tube 102 at a specific holder position 136, the arm may grab a new length of glass tube 102 from the glass tube loading turret 110 or other glass tube staging device and deliver the new length of glass tube 102 to the main turret 108 at the specific holder position 136. Other methods and apparatuses for delivering new lengths of glass tube 102 to the main turret 108 are contemplated.

Referring to FIG. 2, as previously described, the plurality of processing stations 106 of the converter 100 may include one or more heating stations 202, forming stations 204, separating stations 206, cooling stations 210, piercing stations 212, tube loading stations 214, discharge stations 216, measuring stations 218, tube length drop stations 220, or other stations and/or combinations of these stations. FIG. 2 schematically depicts the arrangement of the processing stations 106 for a converter 100 having a main circuit 116 of sixteen processing stations 106 and a secondary circuit 118 of eight secondary processing stations 112. As previously described, the processing stations 106 of the main circuit 116 are evenly spaced apart and evenly distributed about a circular circuit and the secondary processing stations 112 of the secondary circuit 118 are also evenly spaced apart and evenly distributed about a circular circuit. FIG. 2 also schematically depicts the glass tube loading turret 110 having a plurality of loading channels 132. In FIG. 2, the glass tube loading turret 110 is shown in a position spaced apart from the main circuit 116 for purposes of illustration. Although the glass tube loading turret 110 is depicted as having twenty-four loading channels 132, it is understood that the glass tube loading turret may have more or less than twenty-four loading channels 132.

The main circuit 116 of the converter schematically depicted in FIG. 2 may include one or more heating stations 202, a separating station 206, a piercing station 212, one or more forming stations 204, one or more cooling stations 210, a measuring station 218, a tube length drop station 220, and a tube loading station 214. Although FIG. 2 depicts the main circuit 116 as having a circular arrangement of the processing stations 106, as previously discussed, the main circuit 116 may have the processing stations 106 positioned in other-shaped arrangements, such as linear, polygonal, or other arrangements. With respect to the direction of indexing 222 of the main turret 108, the heating stations 202 may be positioned before the separating stations 206 and each of the forming stations 204 to preheat target regions of the glass tube 102 to a target temperature at which the target region of the glass tube 102 becomes viscous and deformable and may effectively be shaped or stretched and separated. At the separating station 206, the formed glass article 103 (FIG. 1) may be separated from the glass tube 102 (FIG. 1) as its bottom is concurrently formed. The separating station 206 may also be the processing station 106 at which the partially formed glass article 103, once separated, is transferred to the secondary turret 114 (FIG. 1) to be indexed through the secondary circuit 118 of secondary processing stations 112. The piercing station 212 may be positioned on the main circuit 116 downstream of the separating station 206 in the direction of indexing 222 of the main turret 108. At the piercing station 212, a meniscus 350 of the glass tube 102 previously formed in the separating station 206 is pierced, thereby reopening the working end 150 of the glass tube 102.

The forming stations 204 of the main turret 108 may be positioned downstream of the piercing station 212 in the direction of indexing 222. At the forming stations 204, the glass tube 102 is iteratively shaped into the desired shape of the finished glass article. As noted above, one or more heating stations 202 may be positioned before each of the forming stations 204 to preheat target regions of the glass tube 102 to a temperature at which the glass tube 102 may be formed. The forming stations 204 of the main turret 108 shape the working end 150 (FIG. 3A) of the glass tube 102 to form one end of the glass articles 103, and the forming stations 204 of the secondary turret 114 shape the other end of the glass articles 103 after the glass article 103 has been separated from the glass tube 102. In embodiments, the converter 100 may be used to produce vials from the glass tubes 102, and the forming stations 204 of the converter 100 may include one or more shoulder forming stations, one or more flange forming stations, and one or more flange finishing stations, with one or more heating stations 202 positioned before and between each of the forming stations 204. The main circuit 116 may further include a measuring station 218, at which a dimensioning system (not shown) may be used to measure one or more dimensions of the glass tube 102, such as the diameter and thickness for example, and one or more dimensions of the features formed by the forming stations 204. Feature dimensions may include flange thickness, flange length, neck length, neck thickness, overall article length, other feature dimension, or combinations thereof. The measuring station 218 may be positioned directly after the last forming station 204 so that the dimensions are measured while the glass tube 102 is still at elevated temperature. Alternatively, the measuring station 218 may be positioned after one or more cooling stations 210 to measure the dimensions of the glass tube 102 and/or glass article at a lower temperature.

Still referring to FIG. 2, one or more cooling stations 210 may be positioned after the forming stations 204 in the direction of indexing 222 of the main turret 108. A tube length drop station 220 may be positioned after the forming stations 204, between the forming stations 204 and the separating station 206, to drop the partially formed glass tube 102 down, thereby positioning the glass tube 102 for separating the glass article 103 from the glass tube 102 at the separating station 206. The main circuit 116 may also include a tube loading station 214 for loading a new length of glass tube 102 feedstock from the glass tube loading turret 110 to the main turret 108 (FIG. 1). In one or more embodiments, the tube loading station 214 may be incorporated into a cooling station 210. The tube loading station 214 may be positioned between the last forming station 204 and the separating station 206.

The forming stations 204 of the main turret 108 can form features at a first end of the glass article 103. For example, the forming stations 204 may form the shoulder 142 and flange 144 at the top (first end) of a glass article 103 that is a vial or cartridge. Once the glass article 103 is separated from the glass tube 102 at the separating station 206, the glass article 103 is transferred to the secondary processing stations 112 of the secondary turret 114. The secondary processing stations 112 may include one or more forming stations 204 for forming a second end of the glass article 103, which is opposite the first end of the glass article 103. For example, the forming stations 204 of the secondary processing stations 112 may form one or more features at a bottom (second end) of the glass article 103.

The secondary processing stations of the secondary circuit may include one or more heating stations 202, forming stations 204, polishing stations 208, cooling stations 210, discharge stations 216, or other stations or combinations of secondary processing stations 112. Although FIG. 2 depicts the secondary circuit as having a circular arrangement of the secondary processing stations 112, as previously discussed, the secondary circuit may have the secondary processing stations 112 positioned in other-shaped arrangements, such as linear, polygonal, or other arrangements. In one or more embodiments, the secondary processing stations 112 of the secondary circuit 118 may be used to form one or more features of the glass article 103, such as a vial, ampoule, cartridge, or syringe, for example, at an end of the glass article 103 opposite the end formed by the main turret 108. For example, in some embodiments, the glass article 103 is a vial and the forming stations 204 of the secondary circuit 118 may form the bottom of the vial. Other features are also contemplated such as those features characteristic of ampoules, cartridges, syringes, and the like. The secondary circuit 118 may include one or more polishing stations 208 to finish the surface of the glass article. The secondary circuit 118 may further include a plurality of cooling stations 210 and the discharge station 216, at which station the finished glass article 103 may be discharged from the converter 100.

The previous description of the processing stations 106 of the main circuit 116 and the secondary processing stations 112 of the secondary circuit 118 may represent a typical converter 100 for producing vials from the glass tube 102. However, it is understood that more or fewer processing stations 106 and secondary processing stations 112 may be utilized to make vials having different shapes or other glass articles, such as cartridges, syringes, ampoules, or other glass articles. Additionally, it is understood that the processing stations 106 and secondary processing stations 112 may be arranged in any of a number of different orders and/or configurations in order to produce differently shaped glass articles.

Figures 3A, 3B, 3C:
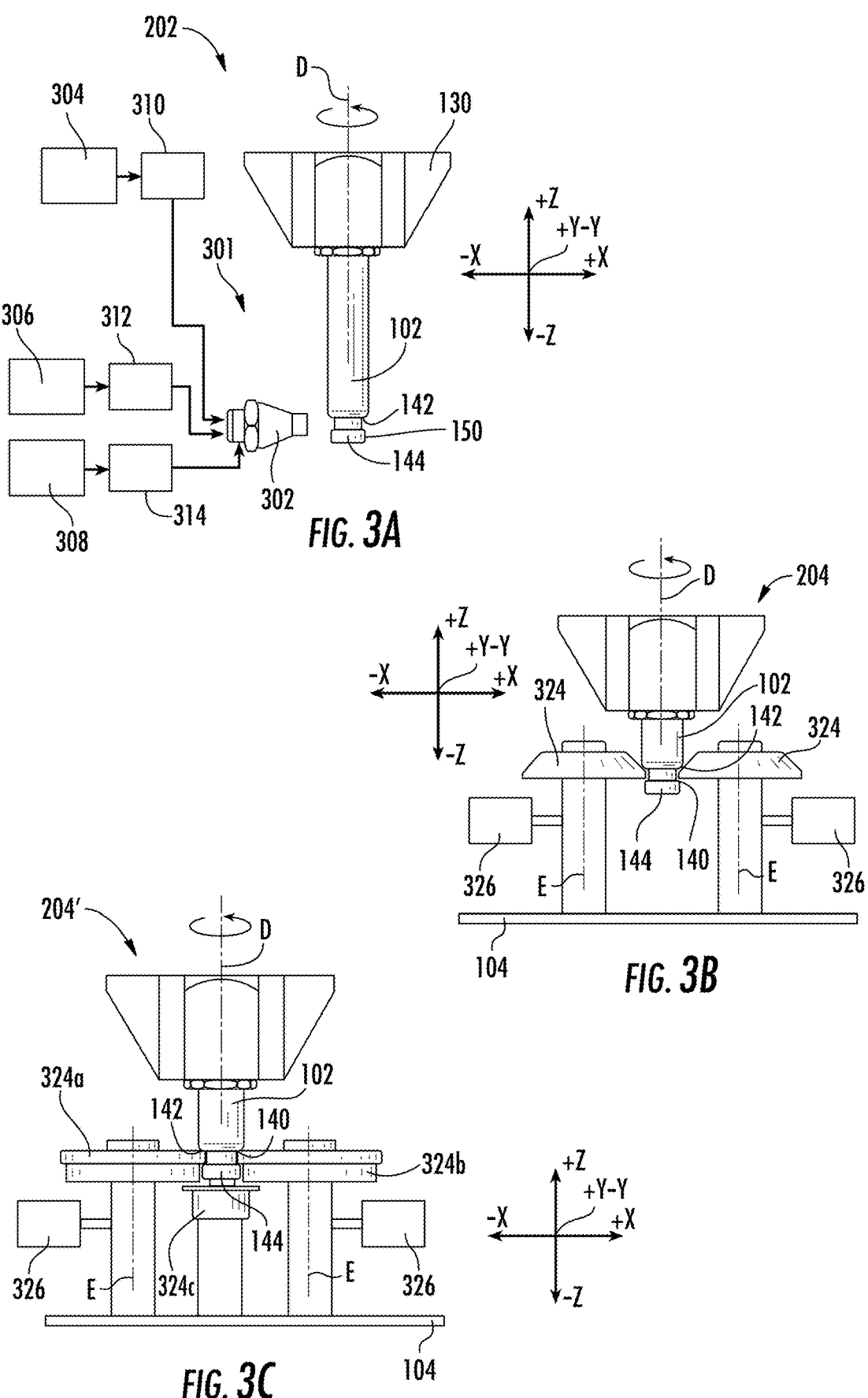
FIG. 3A schematically depicts a heating station of the converter of FIG. 1, according to one or more embodiments shown and described herein.
FIG. 3B schematically depicts a forming station of the converter of FIG. 1, according to one or more embodiments shown and described herein.
FIG. 3C schematically depicts another embodiment of a forming station of the converter of FIG. 1, according to one or more embodiments shown and described herein.

Referring now to FIG. 3A, a heating station 202 of the converter 100 is schematically depicted. Each of the heating stations 202 may include one or more heating elements 301. As illustrated in FIG. 3A, in embodiments, the heating element 301 may include one or more burners 302, which are used to heat targeted regions of the glass tube 102 prior to a forming operation performed at the forming station 204 (FIG. 2) or separating operation performed at the separating station 206 (FIG. 2). Although FIG. 3A depicts a single burner 302, it is understood that more than one burner 302 may be employed in a single heating station 202. Each burner 302 may be fluidly coupled to a fuel supply 304, an oxygen supply 306, and, optionally, an air supply 308. Examples of fuels for the burner 302 may include, but are not limited to hydrogen, hydrocarbon fuel gases such as methane, propane, and butane for example, other fuels, or combinations of these. Each burner 302 may include a fuel control valve 310 to control the flow rate of fuel gas to the burner 302. Each burner 302 may also include an oxygen control valve 312 to control the mass flow rate of oxygen to the burner 302. Each burner 302 may further include an air control valve 314 for optionally controlling a flow rate of air to the burner 302. The burner 302 combusts the fuel gas in the presence of oxygen and/or air to produce a flame that heats at least the target region of the glass tube 102. Although the heating stations 202 of the converter 100 are described herein as heating the glass tube 102 using burners, it is understood that other heating elements or methods other than burners may be used to heat the glass tube 102.

Referring now to FIGS. 3B and 3C, examples of forming stations 204 of the converter 100 are schematically depicted. Each forming station 204 may include one or more forming tools 324 rotatable relative to the base 104 (FIG. 1) about tooling axis E. When indexed into the forming station 204, the glass tube 102, which has been heated in a prior heating station 202, is rotated by the holder 130. The forming tools 324 may be engaged with the outer surface 140 of the glass tube 102 as it rotates. Contact of the forming tools 324 with the outer surface 140 of the heated glass tube 102 may form the glass tube 102 into the desired shape. Upon expiration of the contact time, the forming tool actuators 326 withdraw the forming tools 324 from engagement with the glass tube 102. FIG. 3B schematically illustrates an embodiment of a forming station 204 for forming the shoulder 142 of a glass vial formed from the glass tube 102. FIG. 3C schematically depicts an exemplary embodiment of a forming station 204' for forming the flange 144 of a glass vial formed from the glass tube 102. The forming station 204' for forming the flange 144 comprises three forming tools 324a, 324b, and 324c.

Figure 3D:
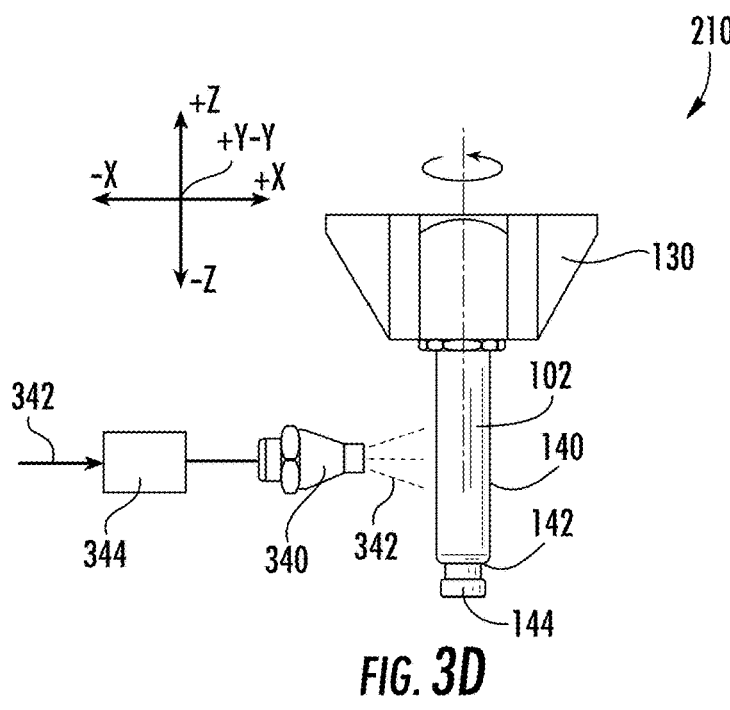
FIG. 3D schematically depicts a cooling station of the converter of FIG. 1, according to one or more embodiments shown and described herein.

FIG. 3D schematically depicts a cooling station 210 having one or more cooling nozzles 340 positioned to direct a cooling fluid 342, such as chilled air or an inert gas for example, towards the glass tube 102. One or more of the cooling nozzles 340 may be positioned to direct the cooling fluid 342 to specific regions of the glass tube 102. One or more cooling fluid control valves 344 may be fluidly coupled to the cooling nozzles 340 to control the mass flow rate of cooling fluid 342 to the cooling nozzles 340, which enable control of the rate of cooling of the glass tube 102 as well as the temperature of the glass tube 102 and temperature gradients in the glass tube 102.

Figure 3E:
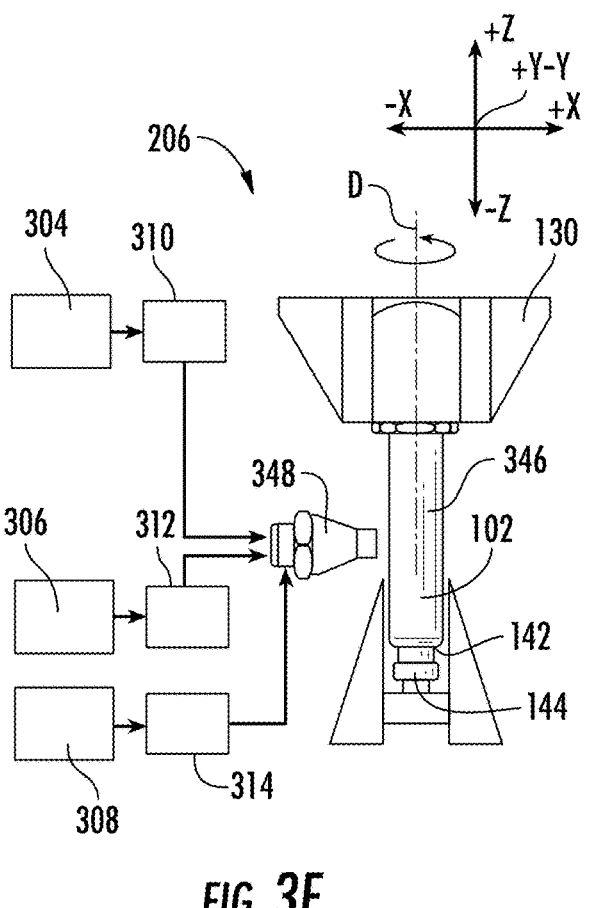
FIG. 3E schematically depicts a separating station of the converter of FIG. 1, according to one or more embodiments shown and described herein.

Referring now to FIG. 3E, a separating station 206 of the converter 100 is schematically depicted. The separating station 206 depicted in FIG. 3E is a thermal separation station and is positioned after one or more heating stations 202 in the direction of indexing 222 of the main turret 108. The heating stations 202 positioned before the separating station 206 heat the glass tube 102 to make the glass viscous. The separating station 206 may include a separating burner 348. While the glass tube 102, which has been made viscously deformable by the previous heating stations 202, is rotated by the holder 130 about the holder axis D, the separating burner 348 may be engaged with the outer surface 140 of the glass tube 102 to heat the glass tube 102 to a temperature at which the viscosity of the glass causes the article to separate from the glass tube 102. Once separated from the glass tube 102, the article may be transferred to the secondary turret 114 (FIG. 1) or discharged from the converter 100. Although shown in FIG. 3E as a thermal separating station, the separating station 206 may also be a non-thermal separating station such as a separating station using score and break techniques, as may be used for syringes and cartridges for example.

Figure 3F:
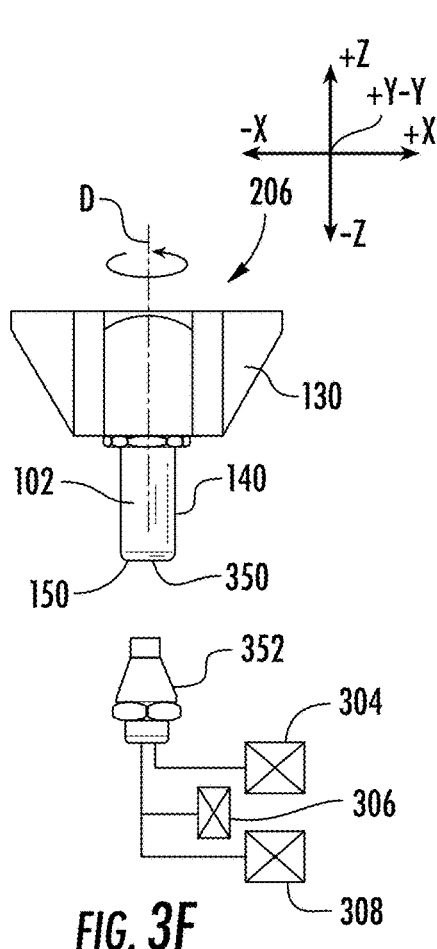
FIG. 3F schematically depicts a piercing station of the converter of FIG. 1, according to one or more embodiments shown and described herein.

Referring now to FIG. 3F, a typical piercing station 212 of the converter 100 is schematically depicted. The piercing station 212 is positioned after the separating station 206 in the direction of indexing 222 of the main turret 108. As previously described, thermal separation of the article 103 from the glass tube 102 in the separating station 206 may cause a meniscus 350 of glass to form across the working end 150 of the glass tube 102. In the piercing station, the meniscus 350 is pierced in preparation for forming the next article at the working end 150 of the glass tube 102. The piercing station 212 may include a piercing burner 352. The piercing burner 352 may be positioned below the working end 150 of the glass tube 102 and may be oriented toward the working end 150 of the glass tube 102. The piercing burner 352 may be fluidly coupled to one or more of a fuel gas supply 304, oxygen supply 306, air supply 308, or combinations of these. The fuel gas supply 304, the oxygen supply 306, and the air supply 308 were previously discussed in relation to the burner 302 of FIG. 3A. When main turret 108 indexes the glass tube 102 into the piercing station 212, the flame from the piercing burner 352 heats the meniscus 350 of glass and melts the meniscus 350 to pierce the meniscus 350 of glass and re-open the working end 150 of the glass tube 102.

FIGS. 3A-3F include schematic illustrations of several different examples of processing stations 106 that may be utilized in the converter 100. However, it should be understood that other processing stations 106 having different structures, combinations of structures, or functions, may be utilized to achieve the desired conversion of the glass tube 102 into one or more glass articles.

Referring again to FIGS. 1 and 2, in operation, the main turret 108 indexes the glass tubes 102, which are secured in the holders 130, into a processing station 106. A specific operation, such as heating, forming, piercing, separating, cooling, dropping, feeding, etc., is performed on the glass tubes 102 at each of the processing stations 106. As used herein, a "dwell time" of the converter 100 refers to the time that the glass tube 102 spends in a particular processing station 106 before being indexed by the main turret 108 to the next subsequent processing station 106. The converter 100 may be tuned so that all of the processing stations 106 complete their operations within the dwell time. At the end of the dwell time, the main turret 108 indexes the glass tubes 102 to the next processing stations 106. As used herein, the "index time" refers to the time that it takes for the main turret 108 to index the glass tubes 102 from one processing station 106 to the next processing station 106 and is measured in units of time. The total time per part per station, as used in this disclosure, is the sum of the dwell time and the index time.

Examples of converters 100 for converting glass tube 102 into glass vials include the Vial Forming Machine Model RP16 with Automatic Tube Feeder manufactured by AMBEG Dr. J. Dichter GmbH, which includes sixteen processing stations 106 in the main circuit 116 and eight secondary processing stations 112. Other examples include the Vial Forming Machine Model RP32 manufactured by AMBEG Dr. J. Dichter GmbH, which has thirty-two processing stations 106 in the main circuit 116 and two secondary circuits 118 with eight secondary processing stations 112 in each secondary circuit 118, and the Zeta 098 Vial Forming Machine manufactured by Euromatic S.R.L., which has 36 processing stations. Another example may include the Zeta 103 Cartridge Forming Machine manufactured by Euromatic S.R.L., which is a converter for converting glass tube into cartridges. The cartridge converter has similar characteristics to the previously described vial converters 100 but is utilized to produce glass articles having a cartridge form factor rather than a vial.

Although described in the context of a converter 100 for producing glass vials from glass tube 102, it should be understood that the converter 100 may be configured to produce one or more other articles, such as cartridges, syringes, ampoules, or other glass articles, by changing the forming tools 324 and/or the order or configuration of processing stations 106 in the main circuit 116 or secondary processing stations 112 in one or more secondary circuits 118.

Referring again to FIGS. 1 and 2, during the converting process, the glass tubes 102 are loaded into the converter 100 at room temperature (approximately 23° C.), but can increase in temperature to over 200° C. during consumption of the glass tube 102. The temperature variation in the glass tubes 102 during consumption is due at least in part to the heat given off by the burners 302 and other heat sources on the converter 100. The temperature can also change due to changes in the gas flow rate through the glass tube 102 as the length of the glass tube 102 decreases. As previously discussed, the temperature of the glass tube 102 changes during processing and consumption of the glass tube 102, which may cause dimensional and cosmetic variations in the glass articles formed during the converting process. The variation in glass tube temperature and the resulting dimensional and cosmetic variations can constrain the operating window of the converting process, decrease the process capability (Cpk), and can decrease yields.

Figure 4:
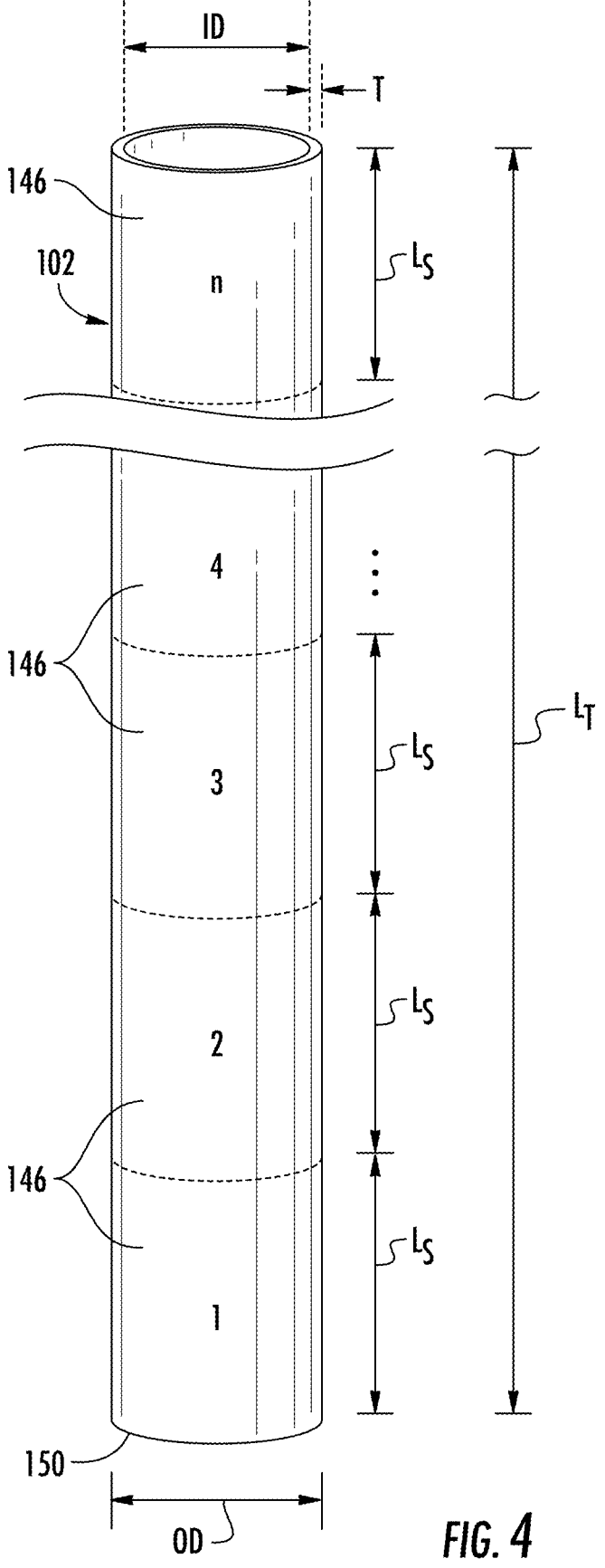
FIG. 4 schematically depicts a perspective view of a glass tube prior to conversion in the converter of FIG. 1, according to one or more embodiments shown and described herein.

The systems and methods of the present disclosure are directed to reducing temperature variation of the glass tube 102 and the resulting dimensional and cosmetic variations in the articles produced therefrom by increasing or decreasing an amount of heating at the working end 150 of the glass tube 102 based on the article number corresponding to the working end 150 of the glass tube 102. Referring to FIG. 4, a length of glass tube 102 prior to converting is schematically depicted. The glass tube 102 has a starting length LT, an outside diameter OD, an inside diameter ID, and a glass thickness T. The glass tube 102 may be portioned or conceptually divided into a plurality of serial segments 146, each serial segment 146 having a length Ls sufficient to form one article from the serial segment 146. Each of the plurality of serial segments 146 may correspond to one article and may be associated with an article number. The article number may be an integer from 1 to n, where 1 corresponds to the first article made from the glass tube 102 and n corresponds to the last article made from the glass tube 102 and the total number of articles that can be made from the glass tube 102. The article number may be indexed by 1 for each successive article made from the glass tube from article number 1 to article number n. After each pass of the glass tube 102 through the circuit of processing stations 106 on the converter 100, a glass article is made and the article number at the working end 150 of the glass tube 102 increases by 1. After article n is formed, the glass tube 102 has been consumed and another glass tube 102 may be loaded into the holder 130.

As previously discussed, the temperature of the glass tube 120 may change as the glass tube 102 is incrementally consumed through each revolution of the main turret 108 of the converter 100. Thus, the temperature of the glass tube 120 may be a function of the article number at the working end 150 of the glass tube 102. This variation in temperature may cause the heated glass of the glass tube 102 to vary in viscosity during heating and forming, which can lead to the dimensional and cosmetic variations. The dimensional variations of the glass articles made from the glass tube 102 are directly proportional to the temperature variations of the glass tube 102.

Referring to FIG. 5, a parameter indicative of a dimension of the articles made from the glass tube 102 (y-axis) as a function of article number (x-axis) is graphically depicted. As shown in FIG. 5, the dimension of the finished articles can change rapidly over the first 10 to 15 articles produced from the newly loaded glass tube. At least a portion of this drastic change in the dimensions of the finished articles over the first 10 to 15 articles can be attributed to the temperature of the glass tube changing during this time. The dimensional variability may decrease for higher article number. However, the dimensional variability of the first several articles produced from the glass tube may cause these articles to be out-of-specification. Rejection of these articles for being out-of-specification may reduce the yield of glass articles from the glass tube.

As previously discussed, the systems and methods of the present disclosure are directed to reducing the temperature variations in the glass tube 102 during consumption of the glass tube 102 in the converter 100 by adjusting the heating of the glass tube 102 in one or more heating stations 202 of the converter 100 based on the article number at the working end 150 of the glass tube 102. The heating of the glass tube 102 may be adjusted by changing a burner dwell time of a burner 302 in engagement with the glass tube 102 at one or more heating stations 202, changing a heating rate of the burner 302 at one or more heating stations 202, changing an exhaust flow rate proximate to one or more heating stations 202, or combinations of these. The heating of the glass tube 102 may be adjusted based on the article number on a per article basis and/or on a per revolution basis (e.g., per each revolution of the main turret 108 of the converter 100). On a per article basis, the amount of heating is adjusted based on the article number each time the main turret 108 of the converter 100 indexes. On a per revolution basis, the amount of heating is adjusted once at the beginning of each revolution of the main turret 108 and the heating amount is maintained for the entire revolution.

Figure 6:
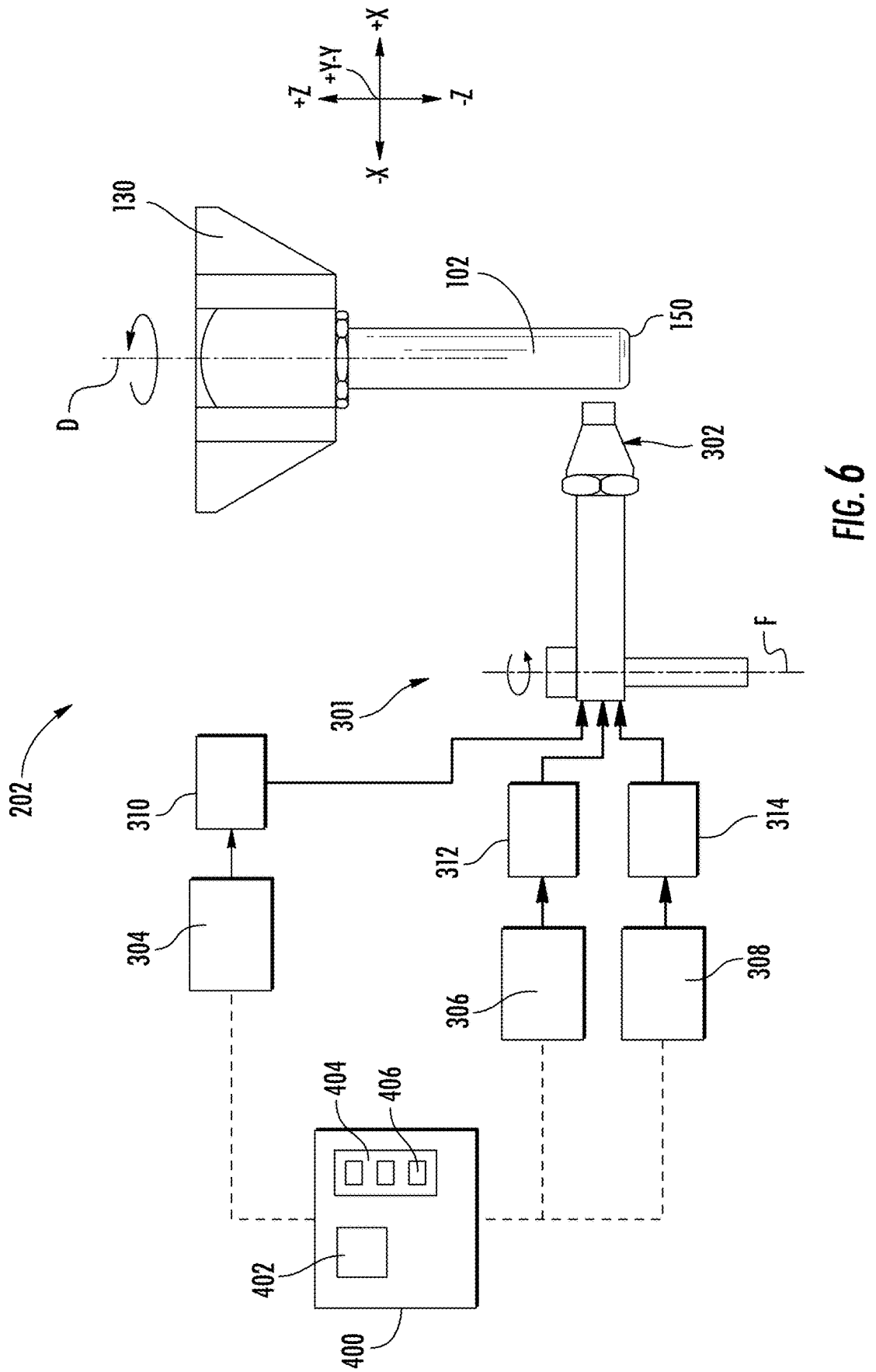
FIG. 6 schematically depicts another heating station of the converter of FIG. 1, according to one or more embodiments shown and described herein.

Referring to FIG. 6, a heating station 202 of the converter 100 according to an embodiment of the present disclosure is schematically depicted. The systems of the present disclosure for producing a plurality of articles from the glass tube

102 may include the converter 100. The converter 100 may include the plurality of processing stations 106 comprising at least one heating station 202, at least one forming station 204, and a separating station 206. The converter 100 may be operable to index the glass tube 106 through the plurality of processing stations 106. The converter 100 may have any of the other features or characteristics previously described herein for the converter 100. The system may further include a system controller 400 communicatively coupled to the converter 100, the system controller 400 may include a processor 402 and a storage medium 404 containing computer readable and executable instructions 406. The system controller 400 may be operable to track the article number at the working end 150 of the glass tube 102 and adjust the heating of the glass tube 102 in the heating station 202 based on the article number at the working end 150 of the glass tube 102. When executed by the processor 402, the computer readable and executable instructions 406 may cause the system controller 400 to track automatically the article number at the working end 150 of the glass tube 102. As previously discussed in relation to FIG. 4, the article number may be an integer corresponding to a serial segment 146 of an initial length of the glass tube 102, where each serial segment corresponds to one article. When executed by the processor 402, the machine readable and executable instructions 406 may further cause the system controller 400 to increase or decrease an amount of heating of the working end 150 of the glass tube 102 based on the article number at the working end 150 of the glass tube 102. The heating of the working end 150 of the glass tube 102 may be increased or decreased by changing the burner dwell time in one or more than one heating station 202, changing the heating rate of the burner 302 in one or more than one heating station 202, changing the exhaust flow rate proximate one or more than one heating station 202, or combinations of these. The heating of the glass tube 102 may be increased or decreased at a single heating station 202 or at a plurality of heating stations 202.

Referring again to FIG. 6, the heating of the glass tube 102 may be increased or decreased by increasing or decreasing, respectively, a burner dwell time in the heating station 202. As previously discussed, the burner dwell time refers to the duration of time that a flame of a burner 302 is engaged with the glass tube 102 to heat the glass tube 102. Increasing or decreasing the amount of heating of the working end 150 of the glass tube 102 may include increasing or decreasing the burner dwell time of the glass tube 102 in engagement with the burner 302 in the at least one heating station 202 based on the article number at the working end 150 of the glass tube 102. The burner dwell time may be increased or decreased in one or more than one heating station 202 based on the article number at the working end 150 of the glass tube 102.

The burner dwell time may be increased or decreased by adjusting the timing of moving the burner 302 into or out of engagement with the glass tube 102. Engagement of the burner 302 with the glass tube 102 may refer to placing the burner 302 in a position in which the flame from the burner 302 extends towards the glass tube 102 or contacts the glass tube 102 to heat the glass tube 102. Conversely, when the burner 302 is out of engagement with the glass tube 102, the burner 302 is placed in a position in which the flame from the burner 302 is directed away from the glass tube 102 so that the flame does not contact or directly heat the glass tube 102. Some heat transfer from the burner 302 to the glass tube 102 may still occur when the burner 302 is out of engagement with the glass tube 102, but this heating is incidental and minimal compared to heating of the glass tube 102 when the burner 102 is in engagement with the glass tube 102.

Figure 7A:
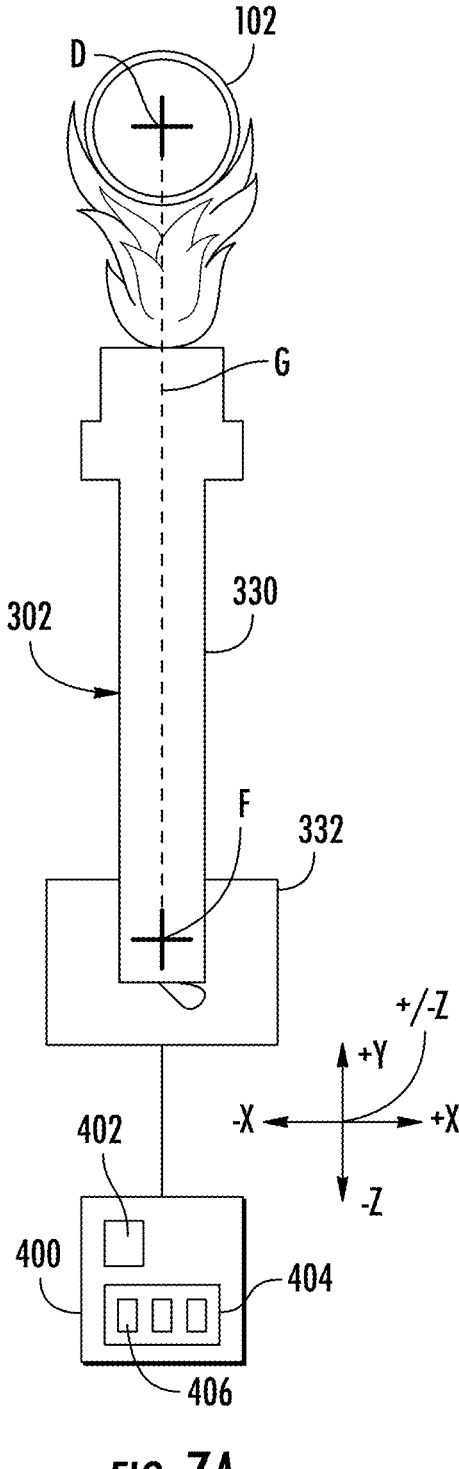
FIG. 7A schematically depicts a top view of a swivel burner of the converter of FIG. 1 in a position of engagement with a glass tube in the heating station of FIG. 6, according to one or more embodiments shown and described herein.
Figure 7B:
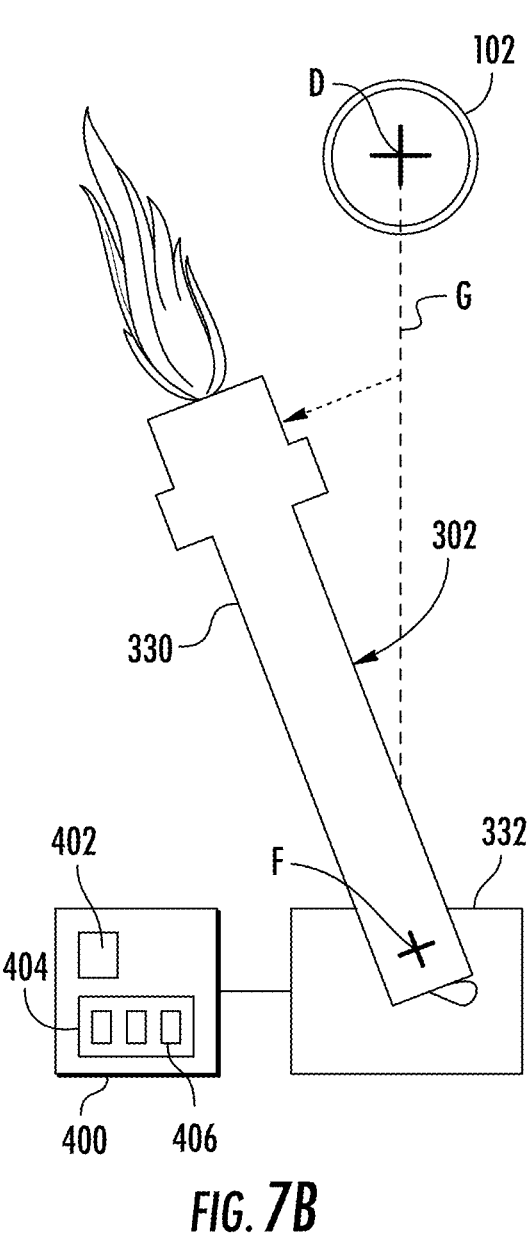
FIG. 7B schematically depicts a top view of a swivel burner of the converter of FIG. 1 in a position out of engagement with a glass tube in the heating station of FIG. 6, according to one or more embodiments shown and described herein.

Referring to FIGS. 7A and 7B, in embodiments, the burner 302 in the heating station 202 may be a swivel burner 330 operable to pivot laterally (e.g., in the X-Y plane according to the coordinate axis in FIG. 6) about axis F into and out of engagement with the glass tube 102. The swivel burner 330 may include a swivel burner actuator 332 operatively coupled to the swivel burner 330. The swivel burner actuator 332 may pivot the swivel burner 330 about the axis F to move the flame of the swivel burner 330 into and out of engagement with the glass tube 102. The swivel burner actuator 332 may be communicatively coupled to the system controller 400, such as being in electrical communication with the system controller 400. The swivel burner actuator 332 may be operable to receive control signals form the system controller 400, where the control signals may cause the swivel burner actuator 332 to pivot the swivel burner 330 into or out of engagement with the glass tube 102.

The swivel burner 300 may pivot into and out of engagement with the working end 150 of the glass tube 102. Referring to FIG. 7A, the swivel burner 330 is depicted in a position in which the flame of the swivel burner 330 is in engagement with the glass tube 102 to heat the glass tube 102. In a position of engagement with the glass tube 102, the flame of the swivel burner 330 may contact or point towards the glass tube 102. In embodiments, in a position of engagement with the glass tube 102, the swivel burner 330 and flame may be aligned along a line G extending through the axis D of rotation of the glass tube 102. FIG. 7B depicts the swivel burner 330 in a position in which the flame of the swivel burner 330 is out of engagement with the glass tube 102. In a position out of engagement with the glass tube 102, the flame of the swivel burner 330 may point away from the glass tube 102 so that the flame does not touch or point directly towards the glass tube 102. In embodiments, when out of engagement, the swivel burner 330 may be oriented so that it does not align with the line G that intersects the axis D of rotation of the glass tube 102.

In embodiments, the swivel burner actuator 332 may be operable to transition the swivel burner 330 between the position of engagement with the glass tube 102 and the position out of engagement with the glass tube 102. In other words, the swivel burner actuator 332 may pivot the swivel burner 330 into and out of engagement with the glass tube 102. In embodiments, the swivel burner 330 may be normally in a position of engagement with the glass tube 102, and the swivel burner actuator 332 may operate to pivot the swivel burner 330 out of engagement with the glass tube 102. Alternatively, the swivel burner 330 may be normally out of engagement with the glass tube 102, and the swivel burner actuator 332 may operate to pivot the swivel burner 330 into engagement with the glass tube 102.

Referring to FIG. 7A, during operation of the system, a glass tube 102 may be indexed into the heating station 202. The glass tube 102 may be a new glass tube in which the article number at the working end is 150 is equal to 1 or a partially consumed glass tube in which the article number is greater than 1. The swivel burner 330 may be transitioned to an engagement position with the glass tube 102 at a time T1. In embodiments, the time T1 may be equal to the time at the end of the index of the converter 100, which is the time at which the glass tube 102 is fully transitioned into the heating station 202. For example, the swivel burner 330 may be transitioned to the engagement position of FIG. 7A during indexing of the converter 100 or at the same time the glass tube 102 is fully indexed into the heating station 202 (e.g., reaches a stationary position in the heating station 202) so that the flame of the swivel burner 330 contacts and heats the glass tube 102 as soon as the glass tube 102 reaches a stationary position in the heating station 202. Alternatively, in embodiments, the time T1 may occur after the glass tube 102 is fully indexed into the heating station 202.

The swivel burner 330 may be maintained in engagement with the glass tube 102 for the duration of the burner dwell time (duration between time T1 and T2). At time T2, which is at the end of the burner dwell time, the swivel burner 330 may pivot out of engagement with the glass tube 102 to stop heating of the glass tube 102, as shown in FIG. 7B. As previously discussed, the target burner dwell time of the glass tube 102 may be determined based on the article number at the working end 150 of the glass tube 102. The burner dwell time of the glass tube 102 in the heating station 202 may be adjusted by changing the timing of pivoting the swivel burner 330 into or out of engagement with the working end 150 of the glass tube 102. Time T1, time T2, or both, may be adjusted to increase or decrease the burner dwell time based on the article number at the working end 150 of the glass tube 102.

The burner dwell time may be adjusted based on the article number at the working end 150 of the glass tube 102 after each index of the main turret 108 of the converter 100. In other words, burner dwell time may be adjusted based on the article number for each successive glass tube 102 indexed into the heating station 202. Thus, article numbers at the working end 150 for each glass tube 102 may be tracked individually so that the burner dwell time may be adjusted for each article for each glass tube 102 independently of all the other glass tubes 102. Adjusting the burner dwell time based on the article number of the glass tube 102 with each index of the converter 100 may enable the new glass tubes 102 to be randomly replaced whenever a glass tube 102 is fully consumed rather than having to load new glass tubes 102 in consecutive order.

In embodiments, the burner dwell time may be adjusted based on the article number at the working end 150 of the glass tube 102 on a per revolution basis for each revolution of the main turret 108 of the converter 100. In these embodiments, once consumed, each glass tube 102 may be replaced with a new length of glass tube 102 in direct succession (one immediately after the other) so that all the holders 130 in the main turret 108 are loaded with a new length of glass tube 102 during the same revolution of the main turret 108. When new glass tubes 102 are loaded consecutively in order, the article number at the working end 150 of the glass tube 102 will be the same for all the glass tubes 102 indexed through the heating station 202 during a single revolution. Thus, in these embodiments, the burner dwell time may be increased or decreased once per revolution of the converter 100 based on the article number at the working end 150 of all the glass tubes 102. A new length of glass tube 102 may be secured in each glass tube holder in consecutive order starting with a first glass tube. In response to a change in the article number at the working end 150 of the first glass tube 102 at the at least one heating station 202, the burner dwell time of the working end 150 of the first glass tube 102 may be adjusted based on the article number and the burner dwell time may be maintained at the heating station 202 from glass tube 102 to glass tube 102 until the first glass tube returns to the heating station 202 and the article number at the working end 150 of the first glass tube changes.

Referring again to FIGS. 7A and 7B, the system may include computer readable and executable instructions 406 that, when executed by the processor 402, may cause the system controller 400 to determine the article number corresponding to the working end 150 of the glass tube 102 and automatically increase or decrease the burner dwell time of the working end 150 of the glass tube 102 based on the article number at the working end 150 of the glass tube 102 by pivoting the swivel burner 330 into or out of engagement with the working end 150 of the glass tube 102. The system controller 400 may send a first control signal to the swivel burner 330 or swivel burner actuator 332 at time T1 to cause the swivel burner 330 or swivel burner actuator 332 to transition the swivel burner 330 into engagement with the glass tube 102. At the conclusion of the burner dwell time at time T2, the system controller 400 may send a second control signal to the swivel burner 330 or the swivel burner actuator 332 indicative of a command to transition the swivel burner 330 to a position out of engagement with the glass tube 102.

Although shown in FIGS. 7A and 7B as including a swivel burner 330 that pivots about the axis F to move the flame into and out of engagement with the glass tube 102, it is understood that other mechanisms for moving the burner 302 into and out of engagement with the glass tube 102 are contemplated. In embodiments, the heating station 202 may include a translation system operable to translate the burner 302 in a linear direction into and out of engagement with the glass tube 102. For example, the translation system may include a track and a burner carriage engaged with the track and translatable along the track to move the burner 302 into and out of engagement with the glass tube 102. The translation system may also include one or a plurality of linear actuators, such as pistons and the like, which may transition the burner 302 into and out of engagement with the glass tube 102.

The heating stations 202 are described herein in the context of burners 302 used to heat the glass tube 102. However, it is understood that other heating elements may also be used to heat the glass tube. Other heating elements may include, but are not limited to, lasers such as $CO_2$ lasers for example, induction heaters, other heating devices, or combinations of these. A laser heating element may be turned off and on to engage or disengage the heating element with the glass tube 102.

Figure 8:
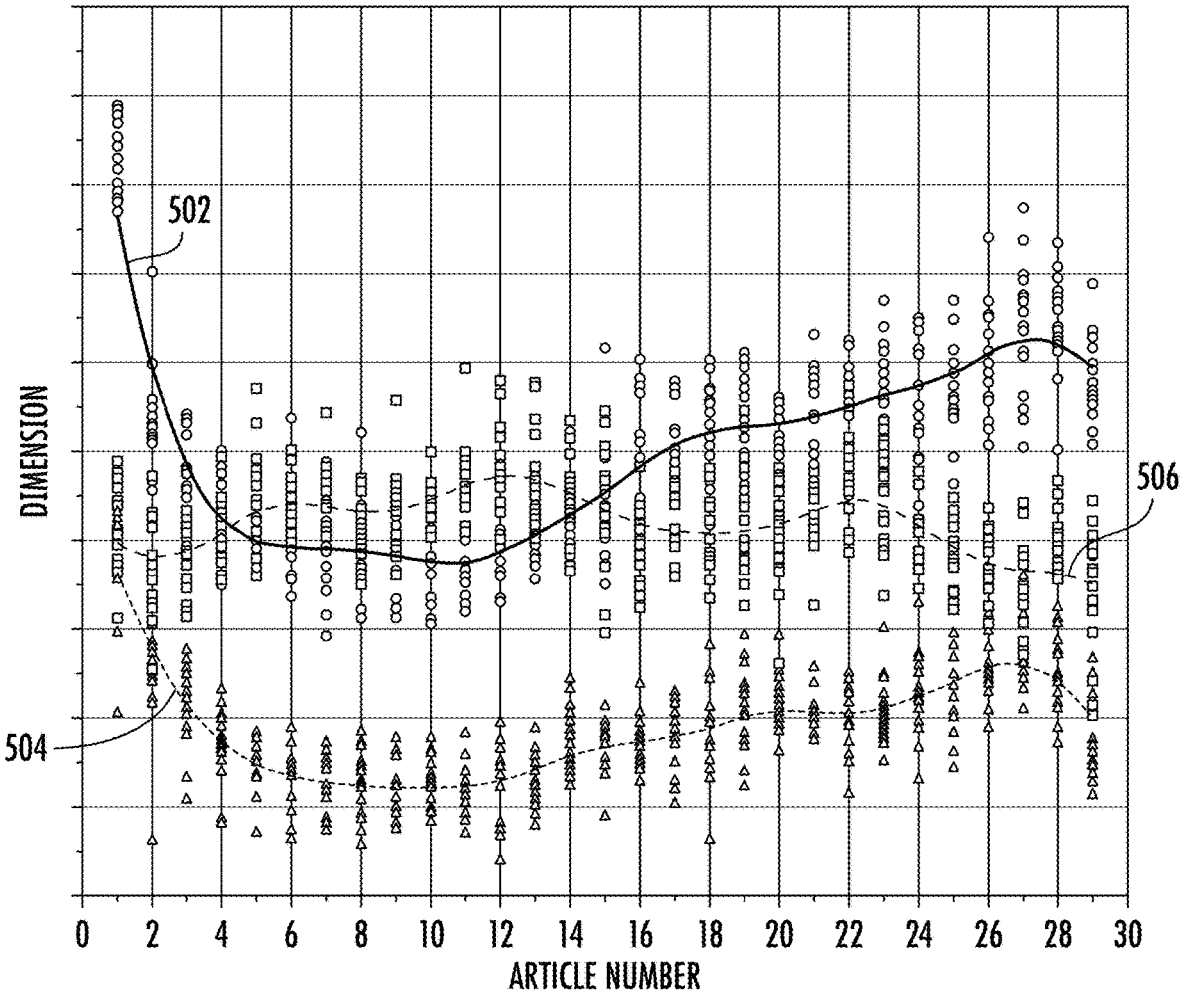
FIG. 8 graphically depicts a dimension of the glass article (y-axis) as a function of article number (x-axis) with and without varying a burner dwell time in the heating station of FIG. 6, according to one or more embodiments shown and described herein.

Referring now to FIG. 8, the impact of adjusting the burner dwell time based on the article number at the working end 150 of the glass tube 102 on the dimensional variability of the glass articles made therefrom is graphically depicted. FIG. 8 shows a parameter indicative of a particular dimension of the glass article (y-axis) as a function of article number (x-axis). Line 502 corresponds to a converter operating with no supplemental heating of the glass tube 102. The line 502 shows an average dimension of the glass article for each article number, where the average dimension for each article number is an average over all 16 articles with the same article number produced during one revolution of the converter having 16 processing stations in the main turret. As shown in FIG. 8, when no supplemental heating of the glass tube 102 is provided, the dimension of the articles can vary greatly from the first article to the nth article ($29^{th}$ article). In particular, the dimension of the glass tube 102 changes sharply over the first few articles as the temperature of the glass tube 102 increases. The dimension levels out for a few more articles before changing rapidly again at article numbers greater than 12 as the gas flow rate through the glass tube 102 increases due to the decreasing overall length of the glass tube 102.

Line 504 in FIG. 8 corresponds to data produced by a converter operating with a fixed duration of supplemental heating at one heating station 202 provided by a swivel burner having a constant dwell time. As indicated by line 504, providing supplemental heating of constant fixed duration may result in an offset of the dimensions of the glass articles compared to operation of the converter 100 with no supplemental heating. Not intending to be bound by any particular theory, it is believed that this is due to an overall increase in temperature of the glass tube 102 at the working end 150, which may decrease the viscosity of the glass leading to the offset in the dimension. This offset of the dimension using a supplemental heating of constant dwell time may result in out-of-specification articles. However, this shows that changing the amount of heating in a heating station 202 can change the dimensions of the articles produced from the glass tube 102.

Line 506 in FIG. 8 corresponds to operation of converter 100 with a swivel burner 330 installed in a processing station 106 that did not previously have a burner and with adjustment of the burner dwell time based on the article number at the working end 150 for each glass tube 102 indexed into the processing station 106. For line 506, the burner dwell time is adjusted at each index of the converter 100 (e.g., per article basis). As shown by line 506, adjusting the burner dwell time based on the article number at the working end 150 of the glass tube 102 can reduce variation in the dimension. Also, adjusting the burner dwell time based on the article number at the working end 150 of the glass tube 102 may not result in offset of the dimension compared to the target dimension. Similar results may be shown by replacing a stationary burner in a heating station 202 with a swivel burner 330 and modifying the burner dwell time. The variability in the dimensions for line 506 may be further reduced through further enhancements and refinements for the models, algorithms, and programs used to control adjustment of the dwell time.

In embodiments, a variability in a position or dimension of a feature of the article produced from the glass tube 102 may be reduced to less than 0.5 mm, less than 0.4 mm, less than 0.3 mm, or even less than 0.2 mm by adjusting the heating of the glass tube 102 based on the article number at the working end 150 of the glass tube 102 compared to a converting process with no adjustment in the amount of heating based on the article number. In embodiments, a variability in a position or dimension of a feature of the article produced from the glass tube 102 may be reduced by at least 50%, at least 60%, at least 70%, or even at least 80% by adjusting the heating of the glass tube 102 based on the article number at the working end 150 of the glass tube 102 compared to a converting process with no adjustment in the amount of heating based on the article number.

Referring again to FIG. 6, the amount of heating of the glass tube 102 in the heating station 202 may be increased or decreased by increasing or decreasing, respectively, the heating rate in the heating station 202 in response to the article number at the working end 150 of the glass tube 102. The heating rate in the heating station 202 may refer to the amount of heat energy output per unit time for the heating element in the heating station 202. The heating element in the heating station 202 may be the burner 302 as previously described herein. The heating rate of the burner 302 may be adjusted by changing the amount (flow rate) of one or more combustion gases introduced to the burner 302. As used herein, the term "combustion gases" refers to the gases, such as fuel gas, oxygen, and/or air that are passed to the burner 302 as sources of combustion reactants, which are combusted to produce heat to heat the glass tube 102. The term "combustion gases" is not intended to refer to the gas stream produced by combustion and containing combustion reaction products. The combustion gases may include the fuel gas and oxygen gas, air, or a combination of these. The heating rate of the heating element, such as burner 302, may be adjusted based on the article number at the working end 150 of the glass tube 102 at one or a plurality of heating stations 202 on the converter to compensate for the temperature variability of the glass tube 102 throughout the converting process.

As previously discussed herein, the heating station 202 may include one or a plurality of burners 302. Each burner 302 may be fluidly coupled to the fuel supply 304, the oxygen supply 306, and, optionally, the air supply 308. Each burner 302 may include at least one fluid control valve operable to control the flow rate, such as mass flow rate, of one or more combustion gases to the burner 302. For example, each burner 302 may be fluidly coupled to the fuel control valve 310 to control the flow rate of fuel gas to the burner 302, an oxygen control valve 312 to control the mass flow rate of oxygen to the burner 302, and, optionally, an air control valve 314 for optionally controlling a flow rate of air to the burner 302. The burner 302 combusts the fuel gas in the presence of oxygen and/or air to produce a flame that heats at least the target region of the glass tube 102. The fuel control valve 310, the oxygen control valve 312, and, optionally, the air control valve 314 may each be communicatively coupled to the system controller 400, such as by being in electronic communication with the system controller 400. The fuel control valve 310, the oxygen control valve 312, and, optionally, the air control valve 314 may each be operable to receive a signal from the system controller 400 indicative of a flow rate of fuel gas, oxygen, and air, respectively, to supply to the burner 302. The flow rate of each gas may be a mass flow rate and the fuel control valve 310, the oxygen control valve 312, and, optionally, the air control valve 314 may be mass flow controllers. In embodiments, the fuel control valve 310, the oxygen control valve 312, and, optionally, the air control valve 314 may not be communicatively coupled to the system controller 400 but may be set to provide a constant fuel to oxygen ratio. In these embodiments, the system may include a main combustion gas flow controller fluidly coupled to the burner 302 and communicatively coupled to the system controller 400. The main combustion gas flow controller may be operable to control the total mass flow rate of combustion gases to the burner 302 where the combustion gas has a constant fuel gas to oxygen ratio, as set by the fuel control valve 310, the oxygen control valve 312, and, optionally, the air control valve 314. Other configurations of the various control valves for the combustion gases are contemplated for controlling the heating rate of the burners 302 in the heating stations 202.

The heating rate for each burner 302 may be increased or decreased by increasing or decreasing a flow rate, such as a mass flow rate, of one or more of the fuel gas, oxygen gas, air, or combinations of these to the burner 302. Increasing or decreasing the heating rate of the burner 302 in the heating station 202 may include increasing or decreasing a flow rate of all of the combustion gases in proportion. In other words, the fuel gas to oxygen ratio of the combustion gas introduced to the burner 302 may be maintained constant and the total flow rate of the combustion gases may be increased or decreased to increase or decrease, respectively, the heating rate of the burner 302. In embodiments, the fuel control valve 310, the oxygen control valve 312, and, optionally, the air control valve 314 may be operated to increase or decrease the mass flow rate of all the combustion gases to the burner 302 while maintaining the fuel gas to oxygen ratio constant. In embodiments, increasing or decreasing the heating rate of the glass tube 102 based on the article number at the working end 150 of the glass tube 102 may include modifying a mass flow ratio of fuel gas to oxygen supplied to the burner 302.

Referring still to FIG. 6, the system may include computer readable and executable instructions 406 which, when executed by the processor 402, may cause the system controller 400 to determine the article number at the working end 150 of the glass tube 102 and automatically increase or decrease a mass flow rate of one or more combustion gases to the at least one burner 302 in the heating station 202 based on the article number at the working end 150 of the glass tube 102. When executed by the processor 402, the computer readable and executable instructions 406 may cause the system controller 400 to send control signals to one of more of the fuel gas control valve 310, the oxygen control valve 312, the air control valve 314, or combinations of these, where the control signals are indicative of a position of the respective flow control valve to achieve the desired heating rate of the burner 302. In embodiments, when executed by the processor 402, the computer readable and executable instructions 406 may cause the system controller 400 to send control signals to the fuel gas control valve 310, the oxygen control valve 312, and, optionally the air control valve 314 to increase or decrease a flow rate of the fuel gas, the oxygen, and, optionally, the air to the burner 302 while maintaining a constant fuel gas to oxygen mass flow ratio introduced to the burner 302.

Figure 9:
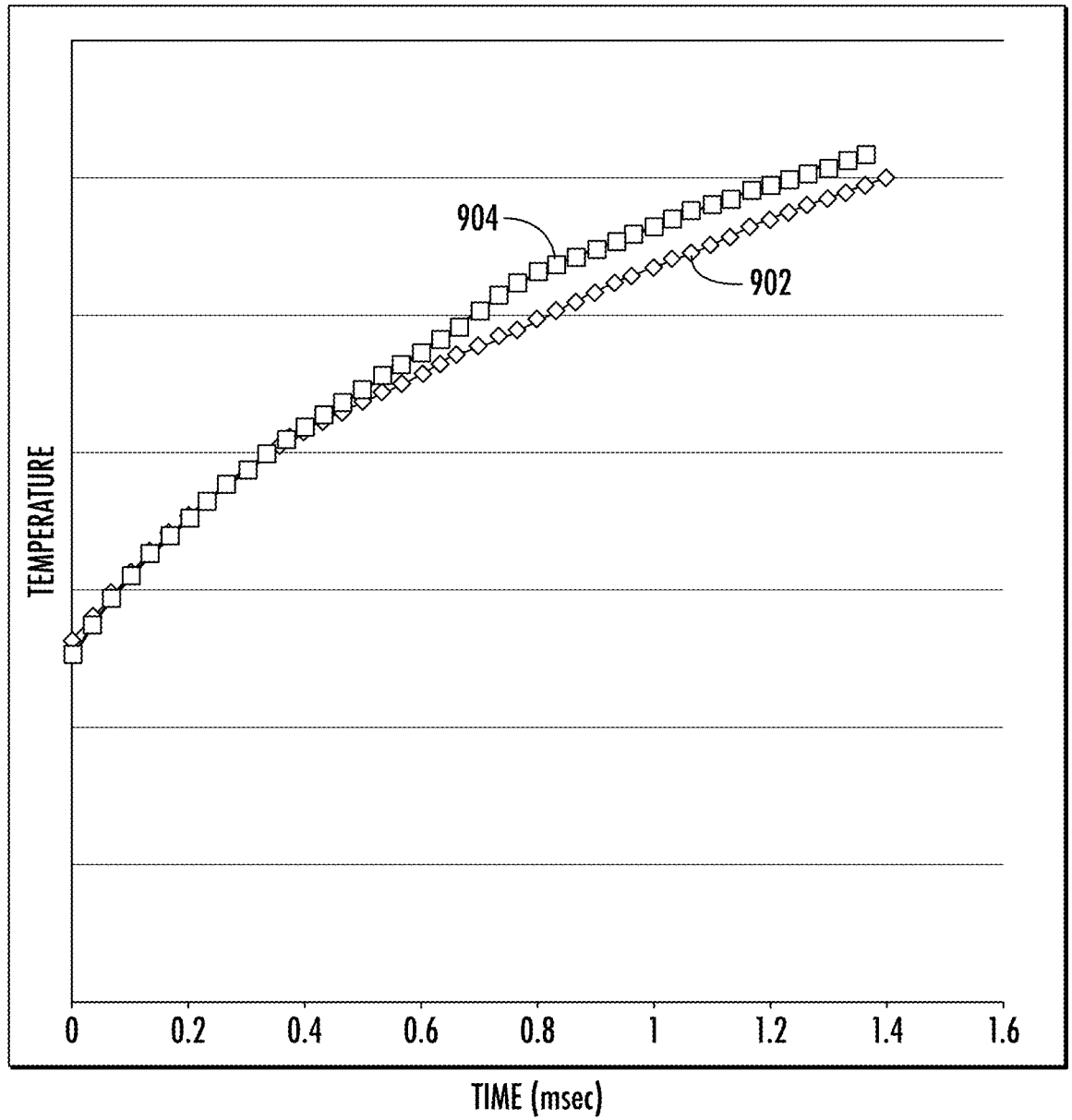
FIG. 9 graphically depicts a temperature of a glass tube (y-axis) as a function of time (x-axis) during a burner dwell time in the heating station of FIG. 7, according to one or more embodiments shown and described herein.

Referring now to FIG. 9, the temperature of the glass tube 102 (y-axis) as a function of time (x-axis) in the heating station 202 is depicted for constant combustion gas flow rate (reference 902) and for an increase in the combustion fuel gas flow rate at time equal to zero (reference 904). Time equal to zero represents the end of the index time of the converter 100 and the point at which the glass tube 102 reaches a stationary position in the heating station 202. Under a constant combustion gas flow rate, the temperature of the glass tube 102 may increase with increasing dwell time in the heating station 202, as shown by line 902. For line 904, the flow rate of combustion gases to the burner 302 in the heating station 202 is incrementally increased at time equal to zero. As shown in FIG. 9, there is a delay in the response of the temperature of the glass tube 102 in response to a change in the flow rate of the combustion gases to the burner 302. Upon initially changing the flow rate of the combustion gases at time equal to zero, the temperature of the glass tube 102 (904) continues to increase at the same rate as the temperature of the glass tube 102 having constant combustion gas flow (902). At a dwell time of around 0.5 seconds, the effects of changing the combustion gas flow begin to take effect and increase the heating rate of the burner 302, which is shown by the deviation of line 904 from line 902 starting at about 0.5 seconds after time equal to zero. The heating rate of the burner 302 takes time to ramp up to the final heating rate after the change in flow rate of combustion gases. This is shown in FIG. 9 by the time period between 0.5 seconds and about 0.8 seconds, during which the slope in the change in temperature is greater than the slope in the change in temperature after 0.8 seconds. This shows a delay in the response of the heating rate of the burner 302 to a change in the flow rate of the combustion gases.

The heating rate of the heating element/burner 302 in the heating station 202 may be adjusted based on the article number at the working end 150 of the glass tube 102 after each index of the main turret 108 of the converter 100. In other words, heating rate of the burner 302 may be adjusted based on the article number for each successive glass tube 102 indexed into the heating station 202. Thus, article numbers at the working end 150 for each glass tube 102 may be tracked individually so that the heating rate of the heating element may be adjusted for each article for each glass tube 102 independently of all the other glass tubes 102. Adjusting the heating rate based on the article number of the glass tube 102 with each index of the converter 100 may enable the new glass tubes 102 to be randomly loaded whenever a glass tube 102 is fully consumed rather than having to load new glass tubes 102 in consecutive order. However, as shown in FIG. 9, the delay in the response of the temperature of the glass tube 102 to a change in the flow rate of combustion gases to the burner 302 may limit the ability of a change in heating rate to adequately compensate for changes in the temperature of the glass tube 102 on a per index basis.

In embodiments, the heating rate of the heating element or burner 302 may be adjusted based on the article number at the working end 150 of the glass tube 102 on a per revolution basis for each revolution of the main turret 108 of the converter 100. In these embodiments, once consumed, each glass tube 102 may be replaced with a new length of glass tube 102 in direct succession (one immediately after the other) so that all the holders 130 in the main turret 108 are loaded with a new length of glass tube 102 during the same revolution of the main turret 108. Under these circumstances, the article number at the working end 150 of the glass tube 102 may be the same for all the glass tubes 102 indexed through the heating station 202 during a single revolution. Thus, in these embodiments, the heating rate may be increased or decreased once per revolution of the converter 100 based on the article number at the working end 150 of all the glass tubes 102. A new length of glass tube 102 may be secured in each holder 130 in consecutive order starting with a first glass tube. In response to a change in the article number at the working end 150 of the first glass tube 102 at the at least one heating station 202, the heating rate of the burner 302 may be adjusted based on the article number at the working end 150 of the glass tube 102, and the heating rate of the burner 302 may be maintained at the heating station 202 from glass tube 102 to glass tube 102 until the first glass tube returns to the heating station 202 and the article number at the working end 150 of the first glass tube changes. By changing the heating rate of the burner 302 on a revolution-by-revolution basis, the impact of the delay in thermal response of the burner 302 to a change in the flow rate of the combustion gases can be reduced.

Figures 10A, 10B:
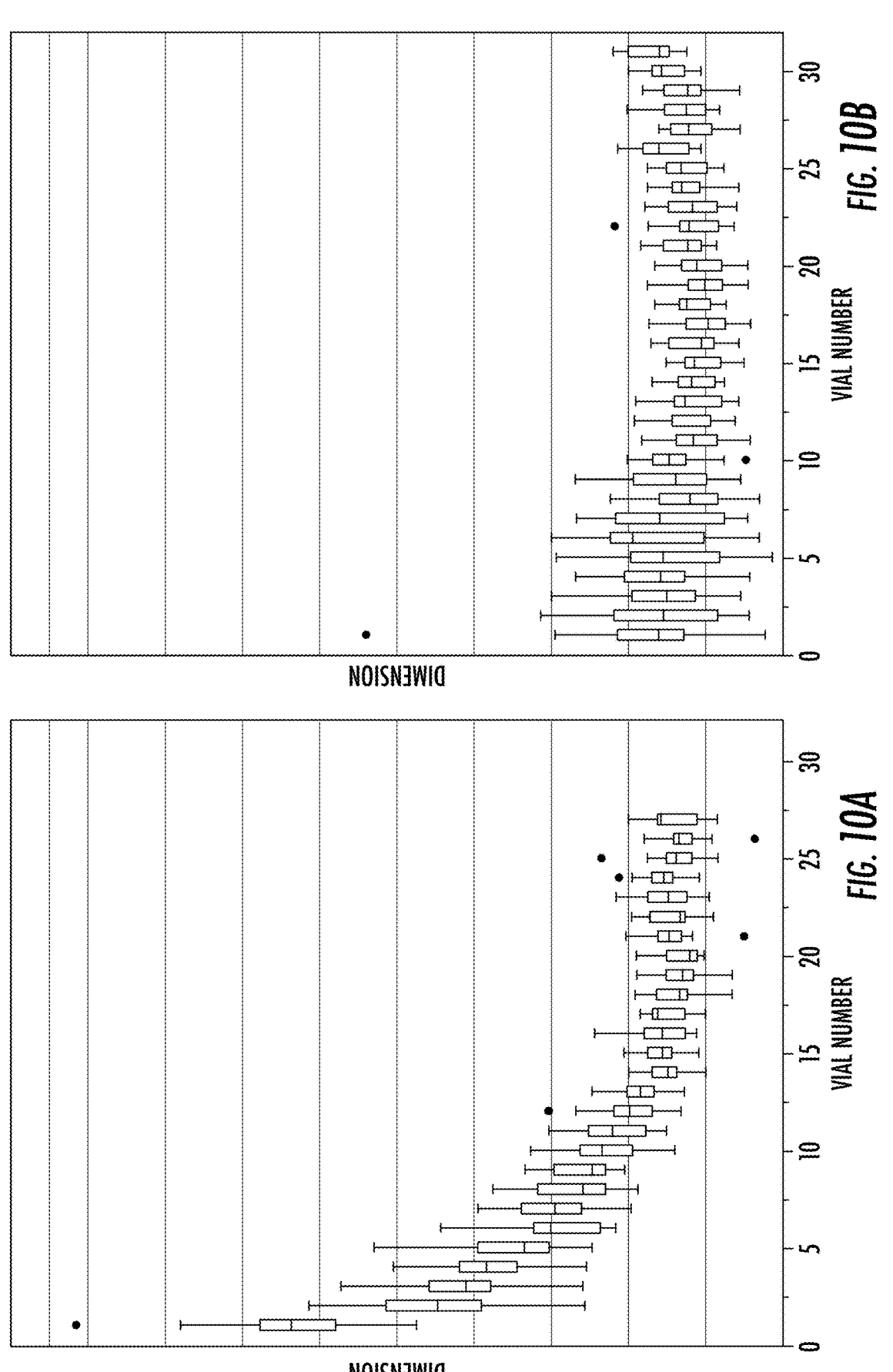
FIG. 10A graphically depicts a dimension of an article (y-axis) as a function of article number (x-axis) without compensating for thermal variability of the glass tube during converting.
FIG. 10B graphically depicts a dimension of an article (y-axis) as a function of article number (x-axis) with adjustment of a heating rate of the burner in the heating station of FIG. 6, according to one or more embodiments shown and described herein.

Referring now to FIGS. 10A, a dimension of the articles from the glass tube 102 (y-axis) as a function of article number at the working end 150 of the glass tube 102 (x-axis) for a converter without compensation for the temperature variability of the glass tube 102 is schematically depicted. As shown in FIG. 10A, the average dimension of the articles changes dramatically over the first 10 to 15 articles produced from the glass tubes (first 10 to 15 revolutions of the main turret). This variability can lead to out-of-specification articles produced initially from the glass tubes, which can reduce the yield from the converting process and increase waste.

Referring now to FIG. 10B, the dimension of articles produced from the glass tubes 102 (y-axis) as a function of article number at the working end 150 of the glass tube 102 (x-axis) for a converter in which the heating rate of the burner 302 in a heating station 202 is adjusted based on the article number at the working end 150 of the glass tubes 102 on a per revolution basis is graphically depicted. As shown in FIG. 10B, adjusting the heating rate of the burner 302 in the heating station 202 based on the article number at the working end 150 of the glass tube 102 on a per revolution basis can greatly reduce the variability in the dimensions of the articles produced therefrom, particularly over the first 10 to 15 articles produced from each glass tube 102. By adjusting the heating rate of the burner based on the article number on a per revolution basis, the variability in the dimensions of the articles can be reduced by at least 50%, at least 60%, at least 70%, or even at least 80% compared to a converter in which the heating rate of the burners are maintained constant. Thus, changing the heating rate of one or more burners 302 in one or more heating stations 202 based on the article number at the working end 150 of the glass tube 102 can reduce dimensional and cosmetic variability in the finished articles.

Figure 11:
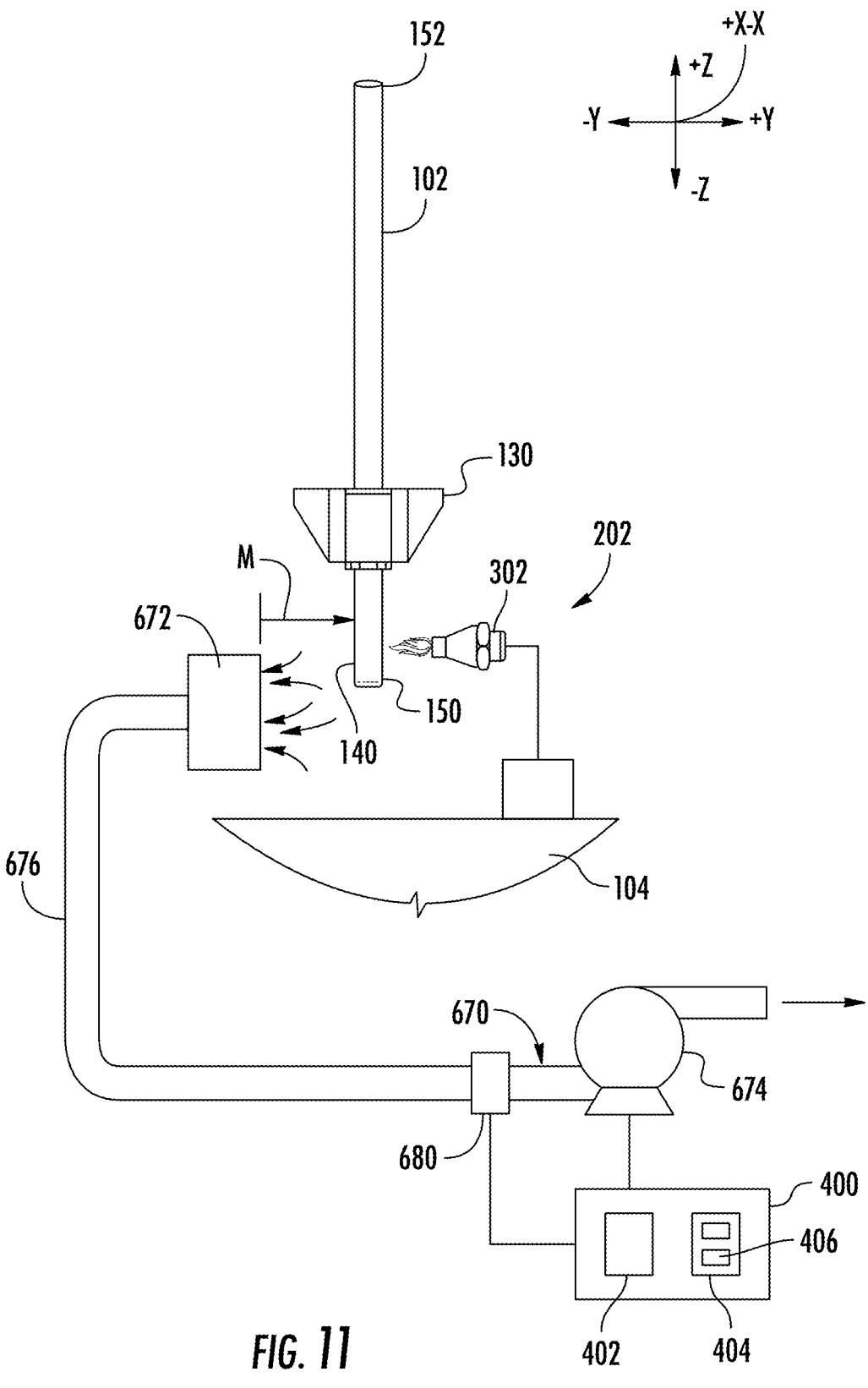
FIG. 11 schematically depicts another heating station of the converter of FIG. 1, according to one or more embodiments shown and described herein.

Referring now to FIG. 11, the heating of the glass tube 102 in the heating station 202 can also be adjusted based on the article number at the working end 150 of the glass tube 102 by changing a flow rate of exhaust air proximate the heating station 202. The converter 100 may include an exhaust system 670 that may include one or a plurality of inlet vents 672 fluidly coupled to an air handler 674 by a duct 676. The air handler 674 may be capable of drawing air into the inlet vent 672 and through the duct 676. Drawing air into the exhaust system through the inlet vent 672 may produce a localized negative pressure in the area of the working end 150 of the glass tube 102, which may be sufficient reduce or overcome a chimney effect in the glass tube 102 to at least reduce or prevent the flow of gases up through the center of the glass tube 102. Reducing or preventing the flow of gases upward through the glass tube 102 may reduce the effects of these gases on the temperature variability of the glass tube 102. Additionally or alternatively, changing the negative pressure in the proximity of the working end 150 of the glass tube 102 can adjust the flow rate of gases through the internal volume of the glass tube 102, thereby controlling the transfer of heat to the unworked length of the glass tube 102. The localized negative pressure produced by the exhaust system 670 may also remove excess heat from the exterior of the glass tube 102, such as from the air surrounding the exterior of the glass tube 102.

The inlet vent 672 may be positioned a distance M from the outer surface 140 of the glass tube 102 at the working end 150 of the glass tube 102. The distance M may be small enough to enable the exhaust system 670 to generate a negative pressure at the working end 150 of the glass tube 102 sufficient to at least partially or fully overcome the chimney effect in the internal volume of the glass tube 102. However, if the distance M is too small, the inlet vent 672 may contact the working end 150 of the glass tube 102 as the glass tube 102 indexes into or out of the processing station 106 due to slight dimensional variations in the glass tube 102 and/or the converter 100. Additionally, if the distance M is too small, the inlet vent 672 may interfere with the performance of the burners, such as the burners 302 of one of the heating stations 202.

The air handler 674 may include, but is not limited to, one or more of a blower, fan, pump, vacuum pump, other vacuum device or air handling apparatus, or combinations of these. In embodiments, the exhaust system 670 may include a plurality of air handlers 674 and one or more processing stations 106, such as heating stations 202 or separating stations 212, may have a dedicated air handler for only that processing station 106. The duct 676 coupling the air handler 674 to the inlet vent 672 may include rigid duct, flexible duct, or a combination of both. Flexible duct may provide for automatic adjustment of the position of the inlet vent 672 relative to the working end 150 of the glass tube 102. Because of the proximity of the inlet vent 672 and duct 676 to the processing stations 106, in some embodiments, the inlet vent 672 and the duct 676 may be constructed of heat resistant materials capable of withstanding the temperatures of heated gases and vapors generated in the proximity of the glass tube 102 in the heating station 202.

The exhaust system 670 may optionally include a damper 680 positioned in the duct 676, between the duct 676 and the air handler 674, or between the duct 676 and the inlet vent 672. The damper 680 may be adjustable to control airflow through the exhaust system 670, thereby controlling the negative pressure generated by the exhaust system 670 at the working end 150 of the glass tube 102. The damper 680 may include one or more of a pneumatic actuator, electric actuator, hydraulic actuator, electromagnetic actuator, or other type of actuator. In some embodiments, the damper 680 may include a solenoid. The air handler 674, the damper 680, or both may be communicatively coupled to the system controller 400 and may be operable to receive control signals form the system controller 400 for controlling the airflow through the exhaust system 670.

Referring again to FIG. 11, an inlet vent 672 may be positioned proximate to a heating station 202. In embodiments, exhaust system 670 may include a plurality of vents 672 with each of the vents 672 positioned at one of the processing stations 106, such as at the heating stations 202. In operation, the inlet vent 672 may be positioned proximate the working end 150 of the glass tube 102 as previous described. The air handler 674 may generate airflow through the duct 676 from the inlet vent 672 towards the air handler 674. Air and gases from the vicinity of the working end 150 of the glass tube 102 may be drawn into the inlet vent 672 by the flow of air through the duct 676, thereby producing a negative pressure proximate the working end 150 of the glass tube 102. The negative pressure may reduce or overcome the chimney effect to reduce or prevent the flow of gases and vapors through the internal volume of the glass tube 102. The airflow through the exhaust system 670 can be adjusted by changing the speed of the air handler 674, changing the position of the damper 680, or both. The negative pressure created proximate to the working end 150 of the glass tube 102 can be modified by changing the speed of the air handler 674, changing the position of the damper 680, changing the position of the inlet vent 672 relative to the working end 150 of the glass tube 102, or combinations of these. Changing the negative pressure may adjust the flow rate of gases through the internal volume of the glass tube 102.

As previously discussed, the heating of the glass tube 102 in the heating stations 202 can be adjusted based on the article number at the working end 150 of the glass tube 102 by changing operation of the exhaust system 670 at the heating station 202. Increasing or decreasing an amount of heating of the glass tube 102 in one or more heating stations 202 may include adjusting a negative pressure produced by the exhaust system 670 proximate the glass tube 102 based on the article number of the working end 150 of the glass tube 102. As previously discussed, adjusting the negative pressure produced by the exhaust system 670 proximate the glass tube 102 may include adjusting the speed of the air handler 674, adjusting the position of the damper 680, adjusting a position of the inlet vent 672 relative to the glass tube 102, or combinations of these. In embodiments, increasing or decreasing the amount of heating of the glass tube 102 in the heating station may comprises adjusting the exhaust flow rate proximate the at least one heating station 202 based on the article number of the working end 150 of the glass tube 102. Adjusting the exhaust flow rate can include adjusting the speed of the air handler 674, adjusting the position of the damper 680, or both.

Referring again to FIG. 11, the system may include computer readable and executable instructions 406 which, when executed by the processor 402, may cause the system controller 400 to determine the article number at the working end 150 of the glass tube 102 and automatically adjust a negative pressure produced by the exhaust system 670 proximate to the glass tube 102 based on the article number at the working end 150 of the glass tube 102. In embodiments, the exhaust system 670 may include the air handler 674, which may be communicatively coupled to the system controller 400, and the computer readable and executable instructions 406 that, when executed by the processor 402, may cause the system controller 400 to automatically adjust a speed of the air handler 674 based on the article number at the working end 150 of the glass tube 102. The computer readable and executable instructions 406, when executed by the processor 402, may cause the system controller 400 to send a control signal to the air handler 674 indicative of an adjusted speed of the air handler 674 in response to the article number at the working end 150 of the glass tube 102.

In embodiments, the exhaust system 670 may include a damper 680, which may be communicatively coupled to the system controller 400, and the computer readable and executable instructions 406, when executed by the processor 402, may cause the system controller 400 to automatically adjust a position of the damper 680 based on the article number at the working end 150 of the glass tube 102. The computer readable and executable instructions 406, when executed by the processor 402, may cause the system controller 400 to send a control signal to the damper 680 indicative of a position of the damper 680 in response to the article number at the working end 150 of the glass tube 102.

In embodiments, the exhaust system 670 may include a vent actuator operable to translate the inlet vent 672 relative to the glass tube 102, such as moving the inlet vent 672 closer to or farther away from the glass tube 102. The vent actuator may be communicatively coupled to the system controller 400, and the computer readable and executable instructions 406, when executed by the processor 402, may cause the system controller 400 to automatically adjust a position of the inlet vent 672 based on the article number at the working end 150 of the glass tube 102 by adjusting a position of the vent actuator. The computer readable and executable instructions 406, when executed by the processor 402, may cause the system controller 400 to send a control signal to the vent actuator indicative of position of the inlet vent 672 in response to the article number at the working end 150 of the glass tube 102.

The negative pressure produced by the exhaust system 670 may be adjusted based on the article number at the working end 150 of the glass tube 102 on a per index basis. However, a time lag between changes in the exhaust system 670 and the temperatures of the glass tube 102 may limit the applicability of adjustments to the exhaust system 670 on a per index basis (e.g., changes to exhaust system at each index of the main turret of the converter). Alternatively, the negative pressure produced by the exhaust system 670 may be adjusted based on the article number at the working end 150 of the glass tube 102 on a per revolution basis, in which the negative pressure produced by the exhaust system 670 is adjusted based on the article number at the working end 150 of the glass tube 102 and the negative pressure produced by the exhaust system 670 is maintained through one full revolution of the main turret 108 of the converter 100. Changing the exhaust flow rate may also influence other aspects of the tube converting process, such as formation of SHR in the glass articles, machine growth, or other factors.

Figure 12:
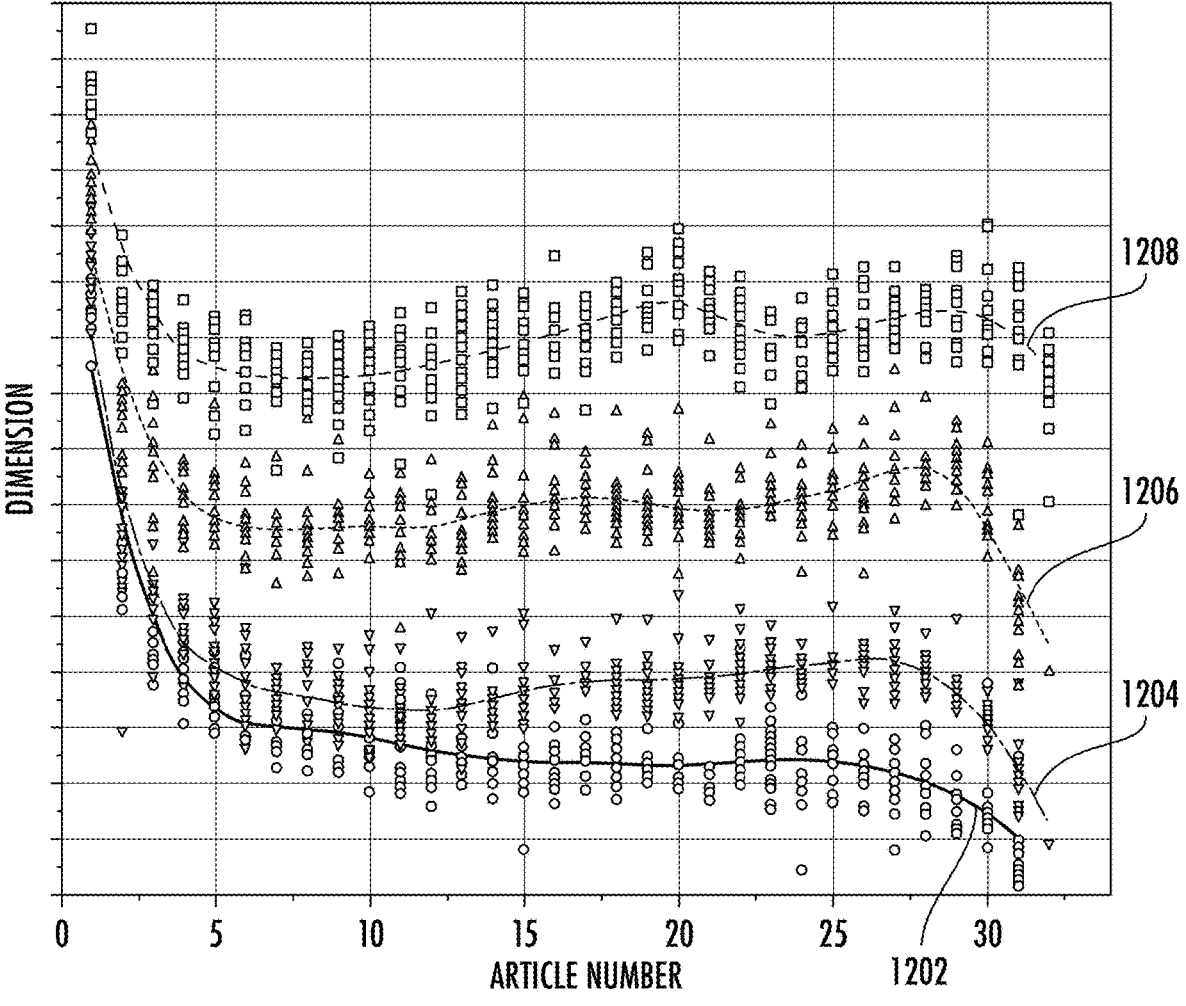
FIG. 12 graphically depicts a dimension of the article (y-axis) as a function of part number (x-axis) at various rates of exhaust flow, according to one or more embodiments shown and described herein.

Referring now to FIG. 12, the influence of exhaust gas flow rate on the dimensional variability is graphically depicted. Line 1202 represents articles produced with zero exhaust airflow. The airflow is incrementally increased for the articles represented by lines 1204, 1206, and 1208. As shown in FIG. 12, increasing the airflow rate can decrease the dimensional variability over the first five articles produced from the glass tube 102, as shown by the reduction in the slope of the curve over the first five articles and the reduction in the maximum difference between the greatest average dimension and least average dimension over the article numbers.

As previously discussed, the heating of the glass tube 102 may be adjusted at one or more than one heating station 202 based on the article number at the working end of the glass tube 102. Adjusting heating of the glass tube 102 at a plurality of heating stations 202 may include adjusting the burner dwell time, adjusting a heating rate of a heating element (e.g., burner 302), or adjusting the exhaust air flow rate or negative pressure produce by the exhaust system 670 at a plurality of the heating stations 202 of the converter 100. Various combinations of adjusting the burner dwell time, heating rate of the burner 302, or exhaust airflow rate may also be used in one or a plurality of heating stations 202 of the converter 100. It is understood that any combination of these methods may be used on one or a plurality of the heating stations 202 of the converter 100 to control the temperature variability of the glass tube 102 during consumption of the glass tube 102 in the converting process. As previously discussed, the burner dwell time, heating rate, exhaust airflow, or combinations of these may be adjusted on a per index basis or on a per revolution basis of the converter 100.

Embodiments of the disclosure may be embodied in hardware and/or in software (including firmware, resident software, micro-code, etc.). The system controller 400 of the converter and/or other controllers on the converter 100 may include at least one processor and the computer-readable medium (i.e., memory module) as previously described in this specification. A computer-usable or the computer-readable medium or memory module may be any medium that can contain, store, communicate, propagate, or transport the program for use by or in connection with the instruction execution system, apparatus, or device.

The computer-usable or computer-readable medium or memory module may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

The computer-readable medium may include machine readable and executable instructions for carrying out operations of the present disclosure. The machine readable and executable instructions may include computer program code that may be written in a high-level programming language, such as C or C++, for development convenience. In addition, computer program code for carrying out operations of the present disclosure may also be written in other programming languages, such as, but not limited to, interpreted languages. Some modules or routines may be written in assembly language or even micro-code to enhance performance and/or memory usage. However, software embodiments of the present disclosure do not depend on implementation with a particular programming language. It will be further appreciated that the functionality of any or all of the program modules may also be implemented using discrete hardware components, one or more application specific integrated circuits (ASICs), or a programmed digital signal processor or microcontroller.

Referring again to FIG. 6, methods for producing a plurality of articles from a glass tube 102 may include securing the working end of the glass tube 102 in a glass tube holder 130 of a converter 100 having a plurality of processing stations 106. The plurality of processing stations 106 may include at least one heating station 202 and at least one forming station 204 disposed after the at least one heating station 202. The converter 100 may index the glass tube holder 130 through the plurality of processing stations 106. The methods may further include indexing the glass tube 102 through each of the plurality of processing stations 106. The initial length of the glass tube 102 may include a plurality of serial segments 146. In other words, the glass tube 102 may be conceptually portioned into a series of serial segments 146. Each of the plurality of serial segments 146 may correspond to one article and each article may have an article number. The article number may be an integer that starts at 1 at the initial working end of the glass tube and increases by 1 for each successive serial segment 146 to an article number n at the non-working end of the glass tube 102, where n is the total number of articles that can be produced from a single length of the glass tube 102.

The methods may further include heating the working end 150 of the glass tube 102 at the at least one heating station 202. The method may include forming at least one feature of the article at the working end 150 of the glass tube 102 in the at least one forming station 204, separating the article from the working end 150 of the glass tube 102 at a separating station 206, and indexing the glass tube 102 downward in the glass tube holder 130 to form a subsequent article. Indexing the glass tube 102 downward may occur before or after separating the article from the working end 150 of the glass tube 102. The methods may include increasing or decreasing an amount of heating of the glass tube 102 based on the article number corresponding to the working end 150 of the glass tube 102. Increasing or decreasing the amount of heating of the glass tube 102 based on the article number may reduce variation in tube temperature, article dimensions, or both, from one article number to the next article number. Variations in tube temperature, article dimensions, or both, at the working end 150 of the glass tube 102 may be functions of the article number of the article being formed at the working end 150 of the glass tube 102. The articles may be pharmaceutical containers, such as but not limited to vials, cartridges, syringes, ampoules, or other pharmaceutical containers.

Increasing or decreasing the amount of heating of the glass tube 102 may include at least one of increasing or decreasing the burner dwell time of the working end 150 of the glass tube 102 in contact with the heating element (e.g., burner 302) in the at least one heating station 202 based on the article number at the working end 150 of the glass tube 102, increasing or decreasing the heating rate of the heating element or burner 302 in the at least one heating station 202 based on the article number of the working end 150 of the glass tube 102, or adjusting the negative pressure or exhaust air flowrate produced by the exhaust system 670 proximate to the glass tube 102 in the at least one heating station 202 based on the article number of the working end 150 of the glass tube 102.

In embodiments, the plurality of processing stations 106 may include a plurality of heating stations 202 and the methods may include increasing or decreasing an amount of heating of the glass tube 102, such as the working end 150 of the glass tube 102, in a plurality of the heating stations 202 based on the article number corresponding to the working end 150 of the glass tube 102. In embodiments, the methods may include increasing or decreasing an amount of heating of the glass tube 102, such as the working end 150 of the glass tube 102, in each of the plurality of the heating stations 202 based on the article number corresponding to the working end 150 of the glass tube 102.

Referring to FIGS. 7A and 7B, in embodiments, increasing or decreasing the amount of heating of the glass tube 102 may include increasing or decreasing the burner dwell time of the glass tube 102 in contact with the heating element, such as burner 302, in the at least one heating station 202 based on the article number at the working end 150 of the glass tube 102. The heating element in the at least one heating station may comprise a swivel burner 330 that may pivot into and out of engagement with the working end 150 of the glass tube 102. In embodiments, the swivel burner 330 may include the swivel burner actuator 332 and the methods may include actuating the swivel burner actuator 332 where actuation of the swivel burner actuator 332 may pivot or move the swivel burner 330 into and out of engagement with the working end 150 of the glass tube 102 to adjust the burner dwell time. In embodiments, increasing or decreasing the burner dwell time may include adjusting a timing of pivoting the swivel burner 330 into or out of engagement with the working end 150 of the glass tube 102.

Referring again to FIG. 6, in embodiments, increasing or decreasing the amount of heating of the working end 150 of the glass tube 102 may include increasing or decreasing the heating rate of the heating element in the at least one heating station 202 based on the article number of the working end 150 of the glass tube 102. In embodiments, the heating element may include the burner 302, or swivel burner 330, and increasing or decreasing the heating rate may include increasing or decreasing a flow rate of one or more combustion gases supplied to the burner 302 or swivel burner 330. The combustion gases may include fuel gas and oxygen, air, or both. In embodiments, increasing or decreasing the heating rate of the burner 302 or swivel burner 330 in the at least one heating station 202 may include increasing or decreasing a flow rate of all the combustion gases to the burner 302 or swivel burner 330 in proportion. The methods may include maintaining a constant mass flow ratio of fuel gas to oxygen for the combustion gases passed to the burner 302 or swivel burner 330. In embodiments, increasing or decreasing the heating rate of the burner 302 or swivel burner 330 in the at least one heating station 202 may comprise modifying a flow ratio of fuel gas to oxygen supplied to the burner 302 or swivel burner 330.

Referring again to FIG. 11, in embodiments, increasing or decreasing the amount of heating of the working end 150 of the glass tube 102 may include adjusting the negative pressure or exhaust air flowrate produced by the exhaust system 670 proximate glass tube 102 in the at least one heating station 202 based on the article number of the working end 150 of the glass tube 102. In embodiments, adjusting the negative pressure or exhaust air flowrate produced by the exhaust system 670 proximate to the at least one heating station 202 may comprise increasing or decreasing a speed of the air handler 674 fluidly coupled to the inlet vent 672 positioned proximate to the at least one heating station 202, adjusting a position of a damper 680 disposed between the air handler 674 and the inlet vent 672, or both. Alternatively or additionally, in embodiments, adjusting the negative pressure or exhaust air flowrate produced by the exhaust system 670 proximate to the at least one heating station 202 may include adjusting the position of the inlet vent 672 of the exhaust system 670 relative to the glass tube 102 in the at least one heating station 202.

Referring to FIGS. 1 and 6, in embodiments, the converter 100 may include a plurality of glass tube holders 130 and the methods may include indexing each of the plurality of glass tube holders 130 through each of the plurality of processing stations 106 and increasing or decreasing the amount of heating at the working end 150 of the glass tube 102 in the at least one heating station 202 based on the article number of the working end 150 of the glass tube 102 each time the plurality of glass tube holders 130 are indexed between processing stations 106.

The methods may include, after a last article corresponding to a last article number n of the glass tube 102 is produced, securing a new length of the glass tube 102 in the tube holder 130. In embodiments, the converter 100 may include a plurality of glass tube holders 130, and the methods may further include securing a new length of the glass tube 102 in each of the plurality of glass tube holders 130 in consecutive order starting with a first glass tube. In other words, the methods may include replacing the glass tubes 102 in the glass tube holders 130 in succession, one after the other. In response to a change in an article number at a working end 150 of the first glass tube at the at least one heating station 202, the methods may further include changing an amount of heating of the working end 150 of the first glass tube based on the article number and maintaining the amount of heating at the at least one heating station 202 from glass tube 102 to glass tube 102 until the first glass tube returns to the at least one heating station 202 and the article number at the working end 150 of the first glass tube changes.

Referring again to FIGS. 1 and 6, methods for producing a plurality of articles from glass tubes 102 may include introducing the glass tube 102 to a glass tube holder 130 of the converter 100 having a plurality of processing stations 106. The plurality of processing stations 106 may include at least one heating station 202 and at least one forming station 204 disposed after the at least one heating station 202. The converter 100 may index the glass tube holder 130 through the plurality of processing stations 106. The methods may include heating the working end 150 of the glass tube 102 at the at least one heating station 202 and forming at least one feature of a first article at the working end 150 of the glass tube 102 in the at least one forming station 204. The first article may corresponding to a first serial position along a length L of the glass tube 102. The methods may include separating the first article from the working end 150 of the glass tube 102 at a separating station 106 disposed after the forming stations 204 and indexing the glass tube 102 downward in the glass tube holder 130 to form a second article from the glass tube 102. The second article may corresponding to a second serial position along the length of the glass tube 102. The glass tube 102 may be indexed downward before or after separation. The methods may include heating the working end 150 of the glass tube 102 corresponding to the second serial position at the at least one heating station 202 and increasing or decreasing an amount of heating of the working end 150 of the glass tube 102 corresponding to the second serial position relative to the heating of the first article. Increasing or decreasing the amount of heating of the working end 150 of the glass tube 102 for the second article relative to the first article may reduce temperature or dimensional variability in the second article relative to the first article. The heating of the glass tube 102 may be increased or decreased according to any of the methods or techniques previously described herein.

EXAMPLES

The following examples illustrate the operation of the disclosed system and methods for producing a plurality of glass articles from glass tube in a converter. The following examples are not intended to be limit the scope of the present disclosure.

The following examples illustrate use of the disclosed systems and methods for reducing dimensional and cosmetic variations in articles made from glass tubing by reducing temperature variability of the glass tubes as the glass tubes are incrementally consumed during the converting process. The glass tubing in these Examples was aluminosilicate glass tubing, such as VALOR™ glass manufactured and marketed by Corning Incorporated. The aluminosilicate glass tubing may be further processed by annealing and/or ion exchanging the glass tubing after converting.

Burner Dwell Time—Comparative Examples 1 and 2 and Example 3

For Comparative Examples 1 and 2 and Example 3, the effect of burner dwell time on the dimensional variability of the glass articles made from the glass tubes was investigated. Aluminosilicate glass tubes were converted into glass vials using a converter. The aluminosilicate glass tubes were VALOR™ glass tubes manufactured by Corning Incorporated. The converter used was a Vial Forming Machine Model RP16 with Automatic Tube Feeder manufactured by AMBEG Dr. J. Dichter GmbH, which included sixteen processing stations in the main circuit and eight secondary processing stations in the secondary circuit. Descriptions of the processing stations of the main circuit of the converter used for Example 1 are provided in Table 1 hereinbelow.

TABLE 1

Description of the processing stations of the converter of Example 1

| Station No. | Description of Operation | Type of Station |
|---|---|---|
| A1 | Tube Loading and/ or Cooling Station | Tube Loading/ Cooling |
| A2 | Cool an Existing Tube or Preheat a Newly Loaded Length of Glass Tube | Cooling/ Heating |

TABLE 1-continued

Description of the processing stations of the converter of Example 1

| Station No. | Description of Operation | Type of Station |
|---|---|---|
| A3 | Optional Separation Preheat | Heating |
| A4 | Separation Preheat | Heating |
| A5 | Separating | Separating |
| A6 | Flame Pierce of the Meniscus | Piercing |
| A7 | First Shoulder Preheat | Heating |
| A8 | Second Shoulder Preheat | Heating |
| A9 | Third Shoulder Preheat | Heating |
| A10 | Shoulder Forming | Forming |
| A11 | Flange Preheating | Heating |
| A12 | Flange Forming | Forming |
| A13 | Flange Finish Preheating | Heating |
| A14 | Flange Finishing | Forming |
| A15 | Cooling | Cooling |
| A16 | Tube Drop to Determine the Vial Length | Tube Drop |

For Comparative Example 1, the glass vials were produced with no supplemental heating added to the converter. For Comparative Example 2 and Example 3, a swivel burner was installed in processing station A2. For Comparative Example 2, the glass vials were produced with supplemental heating of fixed duration in processing station A2. The supplemental heating of fixed duration in Comparative Example 2 was provided by the swivel burner having constant dwell time in processing station A2. For Example 3, the glass vials were produced while changing the burner dwell time of the swivel burner from Comparative Example 2 based on the article number at the working end of the glass tube. In Comparative Examples 1 and 2 and Example 3, the mass flow rates of combustion gases to the burners were maintained constant resulting in constant heating rate of the burners. Only the duration of contact of the burner flame with the glass tube was changed.

A total of 16 tubes were loaded into the converter. Thus, for each article number, 16 articles were produced per revolution of the converter. The results for the value of a particular dimension of the articles (y-axis) as a function of article number (x-axis) are graphically depicted in FIG. 8. The data for Comparative Example 1 are depicted as circles and line 502 represents the average over all 16 articles for each article number. The data for Comparative Example 2 are depicted as triangles and line 504 represents the average over all 16 articles for each article number. The data for Example 3 are depicted as squares and line 506 represents the average over all 16 articles for each article number for Example 3.

As shown in FIG. 8, for Comparative Example 1 (line 502), the dimension of the article varies greatly from the first article to the nth article ($29^{th}$ article). In particular, the dimension of the article changes sharply over the first few articles as the temperature of the glass tube increases. The dimension levels out for a few more articles before changing rapidly again at article numbers greater than 12. With the fixed amount of heating added in Comparative Example 2 (line 504), the dimension of the articles was offset compared to the articles produced in Comparative Example 1, but followed the same general trend of a substantial change in the dimension over the first 5 or 6 vials as the glass tube heats up and then additional variability in the dimensions after article 12. Not intending to be bound by any particular theory, it is believed that this is due to changes in the temperature of the glass tube during multiple revolutions of the converter, which may change the viscosity of the glass tube leading to the offset in the dimensions. However, Comparative Example 2 demonstrates that changing the amount of heating changes the dimension of the vials produced from the glass tube.

In Example 3 (line 506), the amount of heating is adjusted on a per index basis based on the article number at the working end of the glass tube. As shown by line 506, adjustment of the amount of heating based on the article number at the working end of the glass tube reduces the variability of the dimensions of the glass articles produced from the glass tube. In particular, for line 506, the substantial change in the dimension of the glass tube over the first 5 articles can be greatly reduced and/or eliminated. Adding the adjustments of the heating amount based on the article number of Example 3 results in a decrease in dimensional variability of the glass articles to about one third or even less than one third of the dimensional variability of Comparative Example 1, which had no adjustment in heating amount. Not intending to be bound by any particular theory, it is believed that further reductions in dimensional variability of Example 3 may be accomplished through further enhancements to the control algorithms for tracking the article number and adjusting the burner dwell time based on the article number.

Heating Rate—Comparative Example 4 and Example 5

In Comparative Example 4 and Example 5, the effect of adjusting the heating rate of the burner in the heating station based on the article number at the working end of the glass tube on the dimensional variability of the glass articles made therefrom was investigated. Aluminosilicate glass tubes were converted into glass vials using the converter described in Comparative Example 1 above. For Comparative Example 4, the heating rate of the burner in the heating station was maintained constant by maintaining the mass flow rate of combustion gases (fuel and oxygen) to the burner constant at constant fuel to oxygen ratio. For Example 5, the heating rate of the burner was adjusted based on the article number at the working end of the glass tube by increasing or decreasing the mass flow rates of the combustion gases, at constant fuel to oxygen ratio, based on the article number at the working end of the glass tube.

The temperature of the glass tube in the heating station as a function of time is shown in FIG. 9 for Comparative Example 4 and Example 5. In FIG. 9, time equal to zero represents the end of the index time of the converter 100 and the point at which the glass tube 102 reaches a stationary position in the heating station 202. Under a constant combustion gas flow rate of Comparative Example 4 (line 902), the temperature of the glass tube increased with increasing time. For Example 5 (line 904), the flow rate of combustion gases to the burner in the heating station was incrementally increased at time equal to zero. As shown in FIG. 9, a delay in the response of the temperature of the glass tube in response to a change in the flow rate of the combustion gases to the burner was observed. Upon initially changing the flow rate of the combustion gases at time equal to zero, the temperature of the glass tube of Example 5 (904) continued to increase at the same rate as the temperature of the glass tube from Comparative Example 4 (902). At a time of around 0.5 seconds after changing the heating rate of the burner, the effects of changing the combustion gas flow began to take effect and increase the temperature of the glass tube, which is shown by the deviation of line 904 from line 902 starting at about 0.5 seconds after time equal to zero. The heating rate of the burner 302 takes time to ramp up to the final heating rate after the change in flow rate of combustion gases. This is shown in FIG. 9 by the time period between 0.5 seconds and about 0.8 seconds, during which the slope in the change in temperature is greater than the slope in the change in temperature after 0.8 seconds. This shows a delay in the response of the temperature of the glass tube to a change in the flow rate of the combustion gases.

FIG. 10A graphically depicts the dimension of the articles produced from the glass tube (y-axis) as a function of article number (x-axis) for Comparative Example 4 for which the heating rate of the burner was maintained constant. As shown in FIG. 10A, without any changes to the heating rate of the burner to compensate for variations in the temperature of the glass tube based on the article number, the average dimension of the articles changes dramatically over the first 10 to 15 articles produced.

For Example 5, the glass tubes were loaded into each holder in consecutive order, and the heating rate of the burner was adjusted once per revolution of the main turret of the converter. FIG. 10B graphically depicts the dimension of the articles produced from the glass tube (y-axis) as a function of article number (x-axis) for Example 5, for which the heating rate of the burner is adjusted based on the article number at the working end of the glass tubes on a per revolution basis. As shown in FIG. 10B, adjusting the heating rate of the burner in the heating station based on the article number at the working end of the glass tube on a per revolution basis can greatly reduce the variability in the dimensions of the articles produced therefrom, particularly over the first 10 to 15 articles produced from each glass tube 102. As shown by a comparison of FIGS. 10A and 10B, the variability in the dimensions of the articles produced can be reduced by 80% by adjusting the heating rate of the burner in the heating station based on the article number of the working end of the glass tube on a per revolution basis. Thus, changing the heating rate of one or more burners in one or more heating stations based on the article number at the working end of the glass tube can reduce dimensional and cosmetic variability in the finished articles.

Exhaust Airflow—Examples 6-9

For Examples 6-9, the effect of adjusting the exhaust flow rate proximate the heating station based on the article number at the working end of the glass tube on the dimensional variability of the glass articles made therefrom was investigated. Aluminosilicate glass tubes were converted into glass vials using the converter described in Comparative Example 1 above. For Example 6, the converter was operated with no exhaust flow at the heating station. For each of Examples 7-9, the exhaust air flow proximate the heating station was maintained constant throughout consumption of the entirety of the glass tubes. The airflow and reference numbers for FIG. 12 corresponding to Examples 6-9 are provided below in Table 2.

TABLE 2

| Example | Reference Number in FIG. 12 | Exhaust Airflow (cfm) |
|---|---|---|
| 6 | 1202 | 0 |
| 7 | 1204 | 1300 |
| 8 | 1206 | 2600 |
| 9 | 1208 | 3900 |

FIG. 12 graphically depicts a parameter indicative of a dimension of the glass vials (y-axis) as a function of article number (x-axis) for Examples 6-9. As shown in FIG. 12, the amount of exhaust airflow proximate the heating station can effect the variability in the dimensions of the glass vials. Changing the amount of exhaust airflow proximate the heating station can also offset the dimension. These effects can be used to manipulate the temperature of the glass tube at the working end during heating in order to compensate for the temperature changes in the glass tube during consumption of the glass tube over multiple revolutions of the converter.

While various embodiments of the converter 100 and system and methods for producing a plurality of articles from glass tubes 102 have been described herein, it should be understood that it is contemplated that each of these embodiments and techniques may be used separately or in conjunction with one or more embodiments and techniques.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A system for producing a plurality of articles from a glass tube, the system comprising:
    a converter including a plurality of processing stations comprising at least one heating station, at least one forming station, and a separating station, wherein the converter is operable to move the glass tube through the plurality of processing stations; and
    a system controller communicatively coupled to the converter, the system controller comprising a processor and a storage medium containing computer readable and executable instructions which, when executed by the processor, cause the system controller to automatically:
        determine an article number at a working end of the glass tube, wherein the article number comprises an integer corresponding to a serial segment of an initial length of the glass tube, each serial segment corresponding to one article; and
        increase or decrease an amount of heating of the glass tube in the at least one heating station based on the article number at the working end of the glass tube.

2. The system of claim 1, wherein the at least one heating station comprises a swivel burner operable to pivot into and out of engagement with the working end of the glass tube and the system controller is communicatively coupled to the swivel burner.

3. The system of claim 2, wherein the computer readable and executable instructions, when executed by the processor, cause the system controller to automatically increase or decrease a burner dwell time of the working end of the glass tube based on the article number at the working end of the glass tube by pivoting the swivel burner into or out of engagement with the working end of the glass tube.

4. The system of claim 1, wherein the at least one heating station comprises at least one burner and at least one flow controller operable to increase or decrease a mass flow rate of one or more combustion gases to the at least one burner.

5. The system of claim 4, wherein the computer readable and executable instructions, when executed by the processor, cause the system controller to automatically increase or decrease a mass flow rate of one or more combustion gases to the at least one burner based on the article number at the working end of the glass tube.

6. The system of claim 1, wherein the converter comprises an exhaust system comprising at least one inlet vent and an air handler fluidly coupled to the at least one inlet vent.

7. The system of claim 6, wherein the computer readable and executable instructions, when executed by the processor, cause the system controller to automatically adjust a negative pressure produced by the exhaust system proximate to the glass tube based on the article number of the working end of the glass tube.

8. The system of claim 1, wherein the increase or decrease of the amount of heating of the glass tube in the at least one heating station based on the article number at the working end of the glass tube is to reduce variation in a tube temperature, an article dimension, or both, from one article number to the next article number.

9. The system of claim 1, wherein the plurality of processing stations comprises a plurality of heating stations, and
    wherein the computer readable and executable instructions, when executed by the processor, cause the system controller to automatically increase or decrease an amount of heating of the glass tube in each of the plurality of heating stations based on the article number corresponding to the working end of the glass tube.

10. The system of claim 1, wherein the plurality of processing stations further comprises at least one of a piercing station, a cooling station, a measuring station, a tube length drop station, and a tube loading station.

\* \* \* \* \*